United States Patent
Li et al.

(10) Patent No.: US 9,736,157 B2
(45) Date of Patent: Aug. 15, 2017

(54) METHOD AND TRUSTED GATEWAY FOR WIFI TERMINAL ACCESSING TO PACKET DATA PS SERVICE DOMAIN

(71) Applicant: Huawei Technologies Co., Ltd., Shenzhen, Guangdong (CN)

(72) Inventors: Jian Li, Shenzhen (CN); Bing Wang, Shenzhen (CN); Leibin Zheng, Shenzhen (CN); Aixia Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 14/478,576

(22) Filed: Sep. 5, 2014

(65) Prior Publication Data

US 2014/0380434 A1  Dec. 25, 2014

Related U.S. Application Data

(63) Continuation of application No. PCT/CN2013/072277, filed on Mar. 7, 2013.

Foreign Application Priority Data

Mar. 7, 2012  (CN) .......................... 2012 1 0058651

(51) Int. Cl.
*H04L 29/06* (2006.01)
*G06F 21/00* (2013.01)
(Continued)

(52) U.S. Cl.
CPC .......... *H04L 63/0892* (2013.01); *H04L 12/14* (2013.01); *H04L 63/02* (2013.01);
(Continued)

(58) Field of Classification Search
CPC ..... H04L 63/0892; H04L 63/02; H04L 12/14; H04L 61/2015; H04M 15/93;
(Continued)

(56) References Cited

U.S. PATENT DOCUMENTS

2004/0076179 A1  4/2004  Kaminski et al.
2005/0239461 A1  10/2005  Verma et al.
(Continued)

FOREIGN PATENT DOCUMENTS

CN  1497919 A  5/2004
CN  1627842 A  6/2005
(Continued)

OTHER PUBLICATIONS

"3rd Generation Partnership Project; Technical Specification Group Services and System Aspects; Study on S2a Mobility based on GTP & WLAN access to EPC (SaMOG); Stage 2 (Release 11)," 3GPP TR 23.852, V1.0.0, pp. 1-40, 3rd Generation Partnership Project, Valbonne, France (Dec. 2011).
(Continued)

*Primary Examiner* — Lisa Lewis
(74) *Attorney, Agent, or Firm* — Leydig, Voit & Mayer, Ltd.

(57) ABSTRACT

The embodiments of the present invention provide a method and a trusted gateway for a WiFi terminal to access a PS service domain. The method comprises: receiving an accounting request message sent by an authentication, authorization and accounting AAA server or a dynamic host configuration protocol DHCP request message sent by the WiFi terminal; establishing, by a trusted gateway, a first packet data protocol PDP context connection or a first packet data network PDN connection with the PS service domain according to attribute information of the WiFi terminal after receiving the accounting request message or the DHCP
(Continued)

request message, so that the WiFi terminal accesses the PS service domain via the wireless local area network, the trusted gateway, and the established first PDP context connection or the first PDN connection.

10 Claims, 5 Drawing Sheets

(51) Int. Cl.
| | |
|---|---|
| H04W 4/24 | (2009.01) |
| H04W 76/02 | (2009.01) |
| H04L 12/14 | (2006.01) |
| H04W 12/06 | (2009.01) |
| H04M 15/00 | (2006.01) |
| H04L 29/12 | (2006.01) |

(52) U.S. Cl.
CPC ... *H04M 15/8027* (2013.01); *H04M 15/8214* (2013.01); *H04M 15/93* (2013.01); *H04W 4/24* (2013.01); *H04W 12/06* (2013.01); *H04W 76/022* (2013.01); *H04L 61/2015* (2013.01)

(58) Field of Classification Search
CPC ......... H04M 15/8214; H04M 15/8027; H04W 12/06; H04W 4/24; H04W 76/022
See application file for complete search history.

(56) References Cited

U.S. PATENT DOCUMENTS

| | | |
|---|---|---|
| 2006/0126584 A1 | 6/2006 | Zhang et al. |
| 2008/0095119 A1 | 4/2008 | Bachmann et al. |
| 2009/0245202 A1 | 10/2009 | Gras et al. |
| 2010/0208704 A1 | 8/2010 | Wu |
| 2012/0263148 A1 | 10/2012 | Bachmann et al. |
| 2014/0146806 A1 | 5/2014 | Liu et al. |
| 2014/0362807 A1* | 12/2014 | Bhatnagar ............... H04W 4/00 370/329 |

FOREIGN PATENT DOCUMENTS

| | | |
|---|---|---|
| CN | 1663166 A | 8/2005 |
| CN | 101523973 A | 9/2009 |
| CN | 101984724 A | 3/2011 |
| CN | 102148878 A | 8/2011 |
| CN | 102917356 A | 2/2013 |
| EP | 2424160 A1 | 2/2012 |
| JP | 2008516487 A | 5/2008 |
| WO | WO 2012006448 A1 | 1/2012 |

OTHER PUBLICATIONS

"3rd Generation Partnership Project; Technical Specification Group Services and System Aspects; Study on S2a Mobility based on GTP & WLAN access to EPC (SaMOG); Stage 2 (Release 11)," 3GPP TS 23.852, V1.0.0, pp. 1-40, 3rd Generation Partnership Project, Valbonne, France (Dec. 2011).

"3rd Generation Partnership Project; Technical Specification Group Services and System Aspects; 3GPP system to Wireless Local Area Network (WLAN) interworking; System description (Release 10)," 3GPP TS 23.234, V10.0.0, pp. 1-84, 3rd Generation Partnership Project, Valbonne, France (Mar. 2011).

"3rd Generation Partnership Project; Technical Specification Group Services and System Aspects; Architecture enhancements for non-3GPP accesses (Release 11)," 3GPP TS 23.402, V11.1.0, pp. 1-232, 3rd Generation Partnership Project, Valbonne, France (Dec. 2011).

* cited by examiner

METHOD AND TRUSTED GATEWAY FOR WIFI TERMINAL ACCESSING TO PACKET DATA PS SERVICE DOMAIN

CROSS-REFERENCE TO RELATED APPLICATIONS

This present application is a continuation of International Patent Application No. PCT/CN2013/072277, filed on Mar. 7, 2013, which claims priority to Chinese Patent Application No. 201210058651.7, filed on Mar. 7, 2012, both of which are hereby incorporated by reference in their entireties.

FIELD OF THE INVENTION

The present invention relates to communication technologies, and more particularly, to a method and a trusted gateway for a WiFi terminal to access a packet data PS service domain.

BACKGROUND OF THE INVENTION

The integration of mobile communication network and WLAN (Wireless Local Access Network) is required widely, and extremely concerned by domestic and overseas operators. The operators wish the users can access, through WLAN, the self-supported PS service domains, such as games, portal websites and so on.

3GPP R6 TS23.234 defined accessing the self-supported PS (Packet Switch) service domains through WLAN in the year of 2004. But in this scheme, the WiFi terminal needs to establish a specific tunnel with a packet data gateway, and the user needs to be authenticated twice at the beginning, including an authentication of the wireless access network and an authentication of the packet data gateway. In this way, the WiFi terminal needs to support the scheme of establishing tunnel with the packet data gateway, which increases the load of the WiFi terminal, and increases the cost of the WiFi terminal, and the operations of the WiFi terminal are complicated.

SUMMARY OF THE INVENTION

The embodiments of the present invention provide a method and a trusted gateway for WiFi terminal to access a packet data PS service domain, to resolve the problem of overload and high cost in the existing WiFi terminals in the related art.

In order to achieve the above-mentioned objective, the embodiments of the present invention adopt the following technical solutions.

A method for a WiFi terminal to access a packet data PS service domain, applied to a trusted gateway which communicates with communication devices in a wireless local area network and the PS service domain, comprising:

receiving an accounting request message sent by an authentication, authorization and accounting AAA server or a dynamic host configuration protocol DHCP request message sent by the WiFi terminal; and establishing, by the trusted gateway, a first packet data protocol PDP context connection or a first packet data network PDN connection with the PS service domain according to attribute information of the WiFi terminal after receiving the accounting request message or the DHCP request message, so that the WiFi terminal accesses the PS service domain via the wireless local area network, the trusted gateway, and the established first PDP context connection or the first PDN connection; wherein, the attribute information of the WiFi terminal is obtained from the AAA server for the trusted gateway to establish the first PDP context connection or the first PDN connection with the PS service domain for the WiFi terminal to access the PS service domain.

A trusted gateway for a WiFi terminal to access a packet data PS service domain, wherein the trusted gateway communicates with communication devices in a wireless local area network and the PS service domain, and the trusted gateway comprises:

a receiving unit, configured to receive an accounting request message sent by an authentication, authorization and accounting AAA server or a dynamic host configuration protocol DHCP request message sent by the WiFi terminal; and a connection establishing unit, configured to establish a first packet data protocol PDP context connection or a first packet data network PDN connection with the PS service domain according to attribute information of the WiFi terminal after receiving the accounting request message or the DHCP request message, so that the WiFi terminal accesses the PS service domain via the wireless local area network, the trusted gateway, and the established first PDP context connection or the first PDN connection; wherein, the attribute information of the WiFi terminal is obtained from the AAA server for the trusted gateway to establish the first PDP context connection or the first PDN connection with the PS service domain for the WiFi terminal to access the PS service domain.

The method and the trusted gateway for the WiFi terminal to access the PS service domain provided by the embodiments of the present invention establish the first PDP (Packet Data Protocol) connection or the first PDN (Packet Data Network) connection after the trusted gateway receives the accounting request message sent by the AAA (Authentication, Authorization, Accounting) server or the DHCP (Dynamic Host Configuration Protocol) request message sent by the WiFi terminal, making the trusted gateway to be an access point to access the PS service domain, and enabling the WiFi terminal to access the PS service domain via the wireless local area network, the trusted gateway, and the established PDP context connection or the PDN connection. In this way, it is not necessary to establish a specific tunnel between the terminal and the trusted gateway, and the WiFi terminal does not need to be authenticated twice, which lightening the load of the WiFi terminal and reducing the complexity of operation and the cost of the WiFi terminal.

BRIEF DESCRIPTION OF THE DRAWINGS

To illustrate technical solutions of the embodiments of the present invention or the related art more clearly, a brief introduction on the accompanying drawings necessary in the description of the embodiments or the related art is given below. Apparently, the accompanying drawings described below are merely some embodiments of the present invention, based on which other drawings can be obtained by those skilled in the art without any inventive efforts.

EMBODIMENTS OF THE INVENTION

A clear and complete description of technical solutions of the embodiments of the present invention will be given below, in combination with the accompanying drawings in the embodiments of the present invention. Apparently, the embodiments described below are merely a part, but not all, of the embodiments of the present invention. All of other embodiments, obtained by those skilled in the art based on the embodiments of the present invention without any inventive efforts, fall into the protection scope of the present invention.

A First Embodiment

Figure 1:
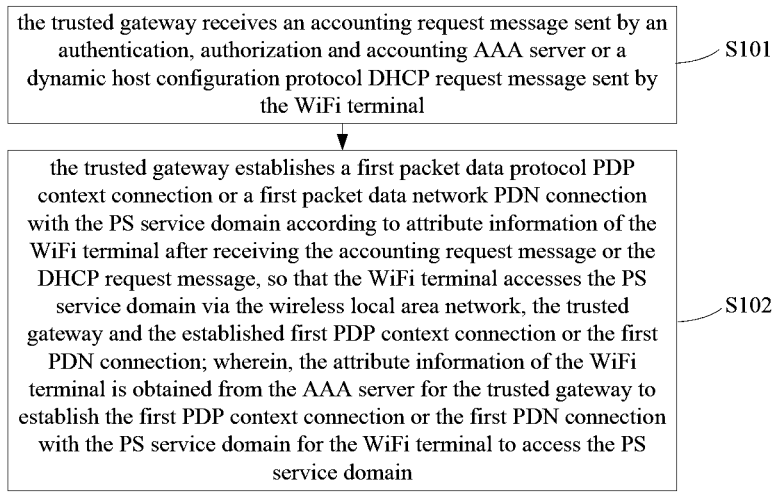
FIG. 1 is a flowchart of a method for WiFi terminal to access PS service domain of a first embodiment of the present invention.

The embodiment of the present invention provides a method for a WiFi terminal to access a PS service domain, applied to a trusted gateway which communicates with communication devices in a wireless local area network and the PS service domain, as shown in FIG. 1. The method includes the processes as follows.

S101, the trusted gateway receives an accounting request message sent by an authentication, authorization and accounting AAA server or a dynamic host configuration protocol DHCP request message sent by the WiFi terminal.

The trusted gateway receives the accounting request message sent by the AAA server or the DHCP request message sent by the WiFi terminal after the WiFi terminal is authenticated. The accounting request message or the DHCP request message is used to trigger the establishment by the trusted gateway of a first PDP context connection or a first PDN connection with the PS service domain.

S102, the trusted gateway establishes a first packet data protocol PDP context connection or a first packet data network PDN connection with the PS service domain according to attribute information of the WiFi terminal after receiving the accounting request message or the DHCP request message, so that the WiFi terminal accesses the PS service domain via the wireless local area network, the trusted gateway, and the established first PDP context connection or the first PDN connection; wherein the attribute information of the WiFi terminal is obtained from the AAA server for the trusted gateway to establish the first PDP context connection or the first PDN connection with the PS service domain for the WiFi terminal to access the PS service domain.

The attribute information of the WiFi terminal may include: a second IP address of the WiFi terminal, an IMSI (International Mobile Subscriber Identification), a first APN (Access Point Name), a WiFi terminal QoS (Quality of Service) information, and an NAS-ID (Network Access Server-Identity) of the AC (Access Controller) which manages the WiFi terminal.

The first APN or the QoS information in the attribute information of the WiFi terminal may be obtained from the AAA server by the trusted gateway, and the AAA server stores the subscription information of the WiFi terminal agreed at the time of subscription with operators. The trusted gateway may also adopt predetermined default values of APN and QoS in establishing the first PDP context connection or the first PDN connection with the PS service domain for the WiFi terminal to access the PS service domain if no APN and QoS information of the WiFi terminal is agreed at the time of subscription with the operators.

In the second generation or the third generation communication network, the trusted gateway establishes the first PDP context connection of a first GGSN (Gateway GPRS Support Node) corresponding to the first APN according to the attribute information of the WiFi terminal after the trusted gateway receives the accounting request message or the DHCP request message.

In the LTE communication network, the trusted gateway establishes the first PDN connection of a first P-GW (PDN Gateway) corresponding to the first APN according to the attribute information of the WiFi terminal after the trusted gateway receives the accounting request message or the DHCP request message.

In the method and the trusted gateway for WiFi terminal to access PS service domain provided by the embodiment of the present invention, the trusted gateway establishes the first PDP context connection with the first GGSN corresponding to the first access point name or the first PDN connection with the P-GW corresponding to the first access point name after the trusted gateway receives the accounting request message sent by the AAA server or the DHCP request message sent by the WiFi terminal, and obtains the first IP address assigned to the WiFi terminal by the first GGSN or the first P-GW, making the trusted gateway to be an access point of the PS service domain and enabling the WiFi terminal to access the PS service domain via the wireless local area network, the trusted gateway, and the established PDP context connection or the PDN connection. In this way, it is not necessary to establish a specific tunnel between the terminal and the trusted gateway, and the WiFi terminal does not need to be authenticated twice, which lightening the load of the WiFi terminal and reducing the complexity of operation and the cost of the WiFi terminal.

A Second Embodiment

Figure 2:
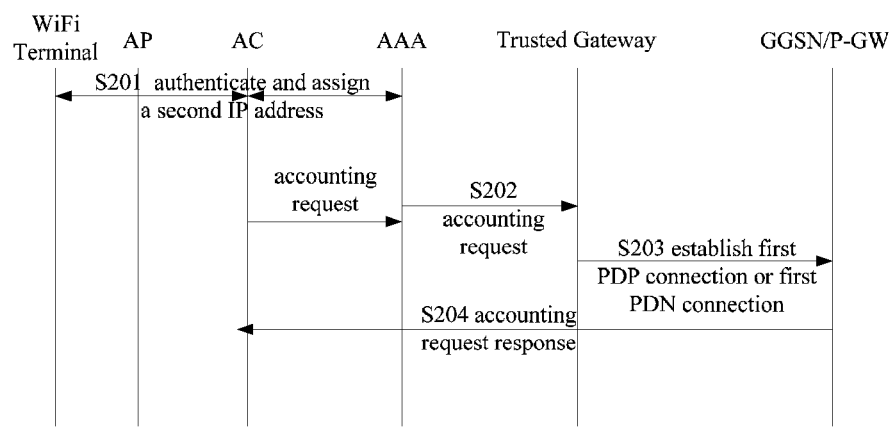
FIG. 2 is a flowchart of a method for WiFi terminal to access PS service domain of a second embodiment of the present invention.

A method for WiFi terminal to access PS service domain provided by a embodiment of the present invention is performed by a trusted gateway. The detailed description hereinafter takes the second generation or the third generation communication network as an example. As shown in FIG. 2, the trusted gateway receiving the accounting request message sent by the AAA server, and the trusted gateway establishing the first PDP context connection with the first GGSN include the processes as follows specifically.

S201, the AC authenticates the WiFi terminal, and assigns a second IP address within the wireless local area network to the WiFi terminal.

During the process of the WiFi terminal accessing the wireless local area network, the WiFi terminal accesses the AC through an AP (Access Point), and the AC requests the AAA server to authenticate the WiFi terminal. The specific authentication mode may be the EAP-SIM/AKA authentication or the Portal authentication. After the authentication is completed, the AC requests a BRAS (Broadband Remote Access Server) or other IP address assignment server to assign the second IP address within the wireless local area network to the WiFi terminal.

S202, the trusted gateway receives the accounting request message sent by the AAA server, wherein the accounting request message carries the attribute information of the WiFi terminal.

After the second IP address is assigned to the WiFi terminal, the AC sends the accounting request message to the AAA server to request the AAA server to start accounting the WiFi terminal. Responding to the accounting request message sent by the AC, the AAA server opens a CDR (calling detail records). Then the AAA server encapsulates the attribute information of the WiFi terminal into the account request message, and sends to the trusted gateway the accounting request message which carries the attribute information of the WiFi terminal.

The AAA server may otherwise forwards the accounting request message sent by the AC to the trusted gateway directly, wherein the attribute information of the WiFi terminal is predetermined in the trusted gateway.

Herein, the attribute information of the WiFi terminal includes: a second IP address of the WiFi terminal, IMSI, a first APN, WiFi terminal QoS information, an NAS-ID of the AC which manages the WiFi terminal.

The first APN or the QoS information in the attribute information of the WiFi terminal may be obtained from the AAA server by the trusted gateway, and the AAA server stores the subscription information of the WiFi terminal agreed at the time of subscription with operators. The trusted gateway may also adopt predetermined default values of APN and QoS in establishing the first PDP context connection with the PS service domain for the WiFi terminal to access the PS service domain if the no APN and QoS information of the WiFi terminal is agreed at the time of subscription with the operators.

S203, the trusted gateway establishes the first PDP context connection with the first GGSN corresponding to the first access point, and obtains the first IP address assigned to the WiFi terminal by the first GGSN or the first P-GW.

After receiving the accounting request message sent by the AAA server, the trusted gateway is triggered to establish the first PDP context connection with the first GGSN corresponding to the first APN. First, the trusted gateway addresses the corresponding GGSN according to the first APN information. For example, if the first APN is CMNET specifically, the trusted gateway may address the GGSN accessing the Internet. Then, the trusted gateway sends a first PDP activation request message to the GGSN accessing the Internet, for establishing the first PDP context connection between the WiFi terminal and the GGSN accessing the Internet.

The first PDP activation request message carries the attribute information of the WiFi terminal, which is used for establishing the first PDP context connection between the first GGSN and the trusted gateway.

After receiving the first PDP activation request message sent by the trusted gateway, the first GGSN assigns the first IP address to the WiFi terminal, wherein the first IP address is used for the WiFi terminal to access the PS service domain. Then, the first GGSN returns a first PDP activation response message back to the trusted gateway, wherein the first PDP activation response message carries the first IP address assigned by the first GGSN.

The trusted gateway receives the first PDP activation response message returned from the first GGSN, and establishes, according to the first IP address carried by the first PDP activation response message, a correspondence between session information of the WiFi terminal within the wireless local area network and session information of the WiFi terminal within the PS service domain. That is, the session information of the wireless local area network includes the second IP address of the WiFi terminal, the NAS-ID of the AC which manages the WiFi terminal and so on. The session information of the WiFi terminal within the PS service domain includes the first IP address and binding GTP tunnel information between the trusted gateway which establishes the first PDP context connection and the first GGSN. The correspondence between the session information of the WiFi terminal within the wireless local area network and the session information of the WiFi terminal within the PS service domain which is established by the trusted gateway is used for routing an uplink data traffic flow initiated by the WiFi terminal to the corresponding PS service domain or routing a downlink data traffic flow sent by the PS service domain towards the WiFi terminal to the WiFi terminal, respectively, according to the correspondence.

S204, after the trusted gateway establishes the first PDP context connection, the trusted gateway sends an accounting request response message to the access controller AC through the AAA server, wherein the accounting request response message carries the first IP address, so that the WiFi terminal accesses the PS service domain through the wireless local area network.

After the trusted gateway establishes the first PDP context connection with the first GGSN, the trusted gateway sends the accounting request response message to the AAA server, and the AAA server forwards the accounting request response message to the AC, so that the WiFi terminal accesses the PS service domain through the wireless local area network.

Further, after the trusted gateway establishes the first PDP context connection, and when the trusted gateway receives the uplink data traffic flow initiated by the WiFi terminal to access the PS service domain, the trusted gateway converts the second IP address, which is carried by a data packet which bears the uplink data traffic flow, into the first IP address. The trusted gateway sends the data packet which bears the uplink data traffic flow to the corresponding PS service domain according to a destination address of the uplink data traffic flow and the first IP address, via the first PDP context connection.

For example, when the WiFi terminal accesses an Internet service, after the AC receives an uplink data traffic flow initiated by the WiFi terminal to access the Internet service, the AC forwards the uplink data traffic flow to the trusted gateway, and the trusted gateway converts the second IP address, which is carried by the data packet which bears the uplink data traffic flow, into the first IP address according to the correspondence between the session information of the WiFi terminal within the wireless local area network and the session information of the WiFi terminal within the PS service domain which is established in the trusted gateway.

Then, the trusted gateway sends the data packet which bears the uplink data traffic flow to the corresponding PS service domain via the first PDP context connection, according to the destination address of the uplink data traffic flow and the first IP address.

Correspondingly, when the trusted gateway receives the data packet that bears the downlink data traffic flow which is sent form the PS service domain to the WiFi terminal, the trusted gateway converts the first IP address, which is carried by the data packet which bears the downlink data traffic flow, into the second IP address; and the trusted gateway sends the data packet which bears the downlink data traffic flow to the WiFi terminal according to the second IP address.

Specifically, the trusted gateway converts the first IP address, which is carried by the data packet which bears the downlink data traffic flow, into the second IP address, according to the correspondence between the session information of the WiFi terminal within the wireless local area network and the session information of the WiFi terminal within the PS service domain which is established in the trusted gateway. The trusted gateway sends the data packet which bears the downlink data traffic flow to the WiFi terminal according to the second IP address.

Further, after the trusted gateway establishes the first PDP context connection, and when the trusted gateway receives the unlink data traffic flow initiated by the WiFi terminal to access the PS service domain, the trusted gateway determines a second access point name of the uplink data traffic flow according to the destination address of the uplink data traffic flow. If a second GGSN corresponding to the second access point name and the first GGSN are not the same device, the trusted gateway establishes a second PDP context connection with the second GGSN, and obtains a third IP address, which is assigned to the WiFi terminal by the second GGSN, for the WiFi terminal to access the PS service domain.

The trusted gateway converts the second IP address, which is carried by the data packet which bears the uplink data traffic flow, into the third IP address. The trusted gateway sends the data packet which bears the uplink data traffic flow to the corresponding PS service domain according to the destination address of the uplink data traffic flow and the third IP address, via the second PDP context connection.

After the trusted gateway establishes the second PDP context connection, and after the trusted gateway receives the downlink data traffic flow sent from the PS service domain towards the WiFi terminal via the second PDP context connection, the trusted gateway converts the third IP address, which is carried by the data packet which bears the downlink data traffic flow, into the second IP address, and the trusted gateway sends the data packet which bears the downlink data traffic flow to the WiFi terminal according to the second IP address.

Further, the AC monitors the condition of the WiFi terminal accessing the PS service domain when the WiFi terminal accesses the PS service domain, and periodically reports information on traffic, duration and so on of the WiFi terminal accessing the PS service domain. The AAA server updates the CDR according to the information on traffic, duration and so on reported by the AC, and sends the accounting response message to the AC.

Further, when the WiFi terminal initiates an offline request message, or after the WiFi terminal disconnects the communication with the AC in condition of weak signal, after the AC sends the accounting termination message to the AAA server, the AAA server closes the CDR file, and responses to the accounting termination message by sending the accounting termination message to the trusted gateway. After receiving the accounting termination message, the trusted gateway deletes the first PDP context connection between the trusted gateway and the first GGSN.

Further, if the trusted gateway establishes the second PDP context connection, the trusted gateway deletes the second PDP context connection once the trusted gateway receives the accounting termination message.

In order to ensure the security of the WiFi terminal accessing the PS service domain of the operators, the trusted gateway may establish a GRE (Generic Routing Encapsulation) tunnel or a bearer network tunnel with the AC.

In the method for a WiFi terminal to access a PS service domain provided by the embodiment of the present invention, after the AC requests the AAA server to authenticate the WiFi terminal, the AC sends the accounting request message to the AAA server. The AAA server sends the accounting request message to the trusted gateway, thereby triggering the trusted gateway to establish the first PDP context connection with the first GGSN or establish the first PDN connection with the first P-GW, making the trusted gateway to be the access point of the PS service domain, and enabling the WiFi terminal to access the PS service domain via the wireless local area network, the trusted gateway, and the established PDP context connection or the PDN connection. In this way, it is not necessary to establish a specific tunnel between the terminal and the trusted gateway, and the WiFi terminal does not need to be authenticated twice, which lightening the load of the WiFi terminal and reducing the complexity of operation and the cost of the WiFi terminal.

A Third Embodiment

Figure 3:
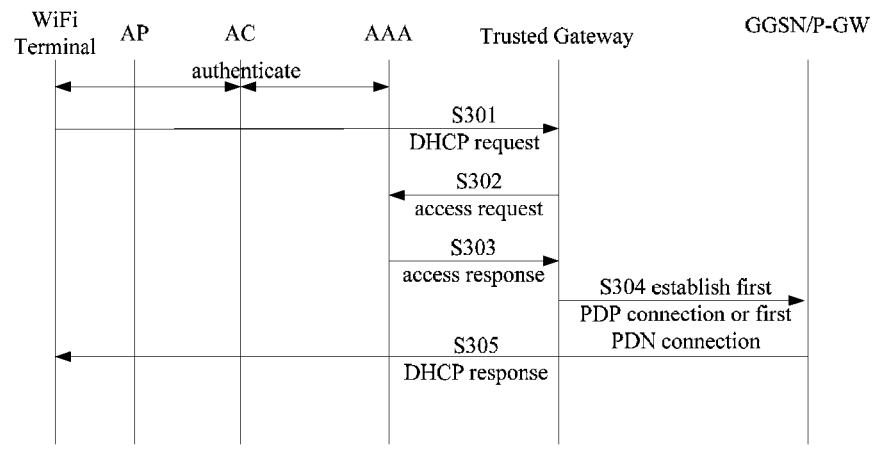
FIG. 3 is a flowchart of another method for WiFi terminal to access PS service domain of a third embodiment of the present invention.

The embodiment of the present invention provides a method for a WiFi terminal to access a PS service domain. The following detailed description takes the second generation or the third generation communication network as an example. As shown in FIG. 3, a trusted gateway receives a dynamic host configuration protocol DHCP request message sent by the WiFi terminal, the DHCP request message triggering the trusted gateway to establish a first PDP context connection with a first GGSN. The method includes the processes as follows specifically.

S301, the trusted gateway receives the DHCP request message sent by the WiFi terminal.

Before the WiFi terminal sends the DHCP request message to the gateway via the AC, the WiFi terminal needs to attach to the WLAN firstly, and request to be authenticated by the AAA server through the AC. After the authentication of the WiFi terminal is completed, the WiFi terminal may send the DHCP request message to the trusted gateway via the AC, and encapsulates an identification number of the WiFi terminal, such as for example an MAC (Media Access Control, media access control) address or an NAI (Network Access Identifier, network access identifier) of the WiFi terminal, in the DHCP request message sent by the WiFi terminal, to identify the WiFi terminal.

S302, the trusted gateway sends the accessing request message to the AAA server.

The trusted gateway receives the DHCP request message sent by the WiFi terminal via the AC, wherein the DHCP request message triggers the trusted gateway to establish the PDP context connection with the corresponding GGSN. In this way, the trusted gateway needs to obtain attribute information of the WiFi terminal from the AAA server first. Specifically, the trusted gateway sends an accessing request message to the AAA server to obtain the attribute information of the WiFi terminal.

S303, the trusted gateway receives the accessing response message sent by the AAA server, wherein the accessing response message carries the attribute information of the WiFi terminal.

The AAA server receives the accessing request message sent by the trusted gateway, and responses to the accessing request message by sending the accessing response message to the trusted gateway, wherein the accessing response message carries the attribute information of the WiFi terminal.

The attribute information of the WiFi terminal includes: a second IP address of the WiFi terminal, an IMSI, a first APN, a WiFi terminal QoS information, and an NAS-ID of the AC which manages the WiFi terminal.

The first APN or the QoS attribute information in the attribute information of the WiFi terminal may be obtained from the AAA server by the trusted gateway, and the AAA server stores the subscription information of the WiFi terminal agreed at the time of subscription with operators. The trusted gateway may also adopt predetermined default values of APN and QoS in establishing the first PDP context connection with the PS service domain for the WiFi terminal to access the PS service domain if no APN and QoS information of the WiFi terminal is agreed at the time of subscription with the operators.

S304, the first PDP context connection is established with the first GGSN corresponding to the first access point name, and the first IP address assigned to the WiFi terminal by the first GGSN or the first P-GW is obtained.

After the trusted gateway receives the accessing response message sent by the AAA server, the trusted gateway determines which GGSN is to specifically establish a connection with, according to the first APN of the WiFi terminal carried by the accessing response message, and then sends a first PDP activation request message to the first GGSN corresponding to the first APN.

The first PDP activation request message carries the attribute information of the WiFi terminal. The attribute information of the WiFi terminal is used to establish the first PDP context connection between the first GGSN and the trusted gateway.

After the first GGSN receives the first PDP activation request message sent by the trusted gateway, the first GGSN assigns the first IP address to the WiFi terminal, wherein the first IP address is used for the WiFi terminal to access the PS service domain. Then, the first GGSN returns a first PDP activation response message to the trusted gateway, wherein the first PDP activation response message carries the first IP address assigned by the first GGSN. Specifically, the first GGSN assigns a corresponding first IP to the WiFi terminal according to the networking. For example, if the AC has a routing function, the first IP address assigned to the WiFi terminal by the first GGSN belongs to the same network segment as the AC which manages the WiFi terminal; and if the AC does not have the routing function, the first GGSN may assign the first IP address to the WiFi terminal without limitation to the same network segment as the AC which manages the WiFi terminal.

The trusted gateway receives the first PDP activation response message returned by the first GGSN, and establishes the correspondence between the session information of the WiFi terminal within the wireless local area network and the session information of the WiFi terminal within the PS service domain, according to the first IP address carried by the first PDP activation response message. That is, the session information of the wireless local area network includes the NAS-ID of the AC which manages the WiFi terminal and so on; and the information of the WiFi terminal within the PS service domain session includes: the first IP address and binding GTP tunnel information between the trusted gateway which establishes the first PDP context connection and the first GGSN. The correspondence between the session information of the WiFi terminal within the wireless local area network and the session information of the WiFi terminal within the PS service domain which is established by the trusted gateway is used for routing an uplink data traffic flow initiated by the WiFi terminal to the corresponding PS service domain or routing a downlink data traffic flow sent by the PS service domain towards the WiFi terminal to the WiFi terminal, respectively, according to the correspondence.

S305, after the trusted gateway establishes the first PDP context connection, the trusted gateway sends a DHCP response message to the WiFi terminal, wherein the DHCP response message carries the first IP address.

Further, after the trusted gateway sends the DHCP response message to the WiFi terminal, the trusted gateway sends an accounting request message to the AAA server to instruct the AAA server to account the WiFi terminal. Responding to the accounting request message, the AAA server opens a CDR.

Further, after the trusted gateway establishes the first PDP context connection, the WiFi terminal is enabled to access the PS service domain via the wireless local area network. When the trusted gateway receives the unlink data traffic flow initiated by the WiFi terminal to access the PS service domain, the method further includes:

the trusted gateway sending the data packet which bears the uplink data traffic flow to the corresponding PS service domain via the first PDP context connection, according to a destination address of the uplink data traffic flow and the first IP address.

For example, when the WiFi terminal accesses an Internet service, after receiving a data packet which bears the uplink data traffic flow accessing the Internet service sent by the WiFi terminal, the AC forwards the data packet to the trusted gateway, wherein the data packet carries the information on the destination address of the uplink data traffic flow, the first IP address, the NAS-ID of the AC managing the WiFi terminal and so on. After the trusted gateway receives the data packet which bears the uplink data traffic flow, the trusted gateway routes the data packet to the first GGSN according to the correspondence between the session information of the WiFi terminal within the wireless local area network and the session information of the WiFi terminal within the PS service domain which is established in the trusted gateway, so that the WiFi terminal accesses the corresponding PS service domain.

Correspondingly, when the trusted gateway receives the downlink data traffic flow which is sent to the WiFi terminal by the PS service domain, the method further includes the trusted gateway sending the data packet which bears the downlink data traffic flow to the WiFi terminal according to the first IP address.

Specifically, according to the correspondence between the session information of the WiFi terminal within the wireless local area network and the session information of the WiFi terminal within the PS service domain which is established in the trusted gateway, if the AC has a routing function, the trusted gateway sends the data packet which bears the downlink data traffic flow to the WiFi terminal according to the first IP address, wherein the first IP address and the IP address of the AC which manages the WiFi terminal belongs to the same network segment. If the AC does not have the routing function, the trusted gateway sends the data packet which bears the downlink data traffic flow to the WiFi terminal according to the first IP address and the NAS-ID in the attribute information of the WiFi terminal.

Further, after the trusted gateway establishes the first PDP context connection, and when the trusted gateway receives the unlink data traffic flow accessing the PS service domain initiated by the WiFi terminal, the trusted gateway determines a second access point name of the uplink data traffic flow according to the destination address of the uplink data traffic flow. If a second GGSN corresponding to the second access point name and the first GGSN are not the same device, the trusted gateway establishes a second PDP context connection with the second GGSN, and obtains a third IP address, which is assigned to the WiFi terminal by the second GGSN, for accessing the PS service domain. The trusted gateway sends the data packet which bears the uplink data traffic flow to the corresponding PS service domain via the second PDP context connection according to the destination address of the unlink data traffic flow and the third IP address.

After the trusted gateway establishes the second PDP context connection, and when the trusted gateway receives, via the second PDP context connection, the downlink data traffic flow sent from the PS service domain towards the WiFi terminal, the trusted gateway sends the data packet which bears the downlink data traffic flow to the WiFi terminal according to the second IP address.

Further, the AC is used to monitor the condition of the WiFi terminal accessing the PS service domain when the WiFi terminal accesses the PS service domain, and periodically report the information on traffic, duration and so on of the WiFi terminal accessing the PS service domain. The AAA server updates the CDR according to the information on traffic, duration and so on reported by the AC, and sends the accounting response message to the AC.

Further, when the WiFi terminal initiates an offline request message, or after the WiFi terminal disconnects the communication with the AC in condition of weak signal, after the AC sends the accounting termination message to the AAA server, the AAA server closes the CDR file, and responses to the accounting termination message by sending the accounting termination message to the trusted gateway. After the trusted gateway receives the accounting termination message, the trusted gateway deletes the first PDP context connection.

Further, if the trusted gateway establishes the second PDP context connection, the trusted gateway deletes the second PDP context connection once the trusted gateway receives the accounting termination message.

In order to ensure the security of the WiFi terminal, the trusted gateway may establish a GRE tunnel or a bearer network tunnel with the AC.

In the method for WiFi terminal to access PS service domain provided by the embodiment of the present invention, after the authentication is completed, the WiFi terminal sends the DHCP request message to the trusted gateway. The DHCP request message triggers the trusted gateway to establish the first PDP context connection with the corresponding first GGSN or the trusted gateway to establish the first PDN connection with the corresponding first P-GW, making the trusted gateway to be an access point of the PS service domain, and enabling the WiFi terminal to access the PS service domain via the wireless local area network, the trusted gateway, and the established PDP context connection or the PDN connection. In this way, it is not necessary to establish a specific tunnel between the terminal and the trusted gateway, and the WiFi terminal does not need to be authenticated twice, which lightening the load of the WiFi terminal and reducing the complexity of operation and the cost of the WiFi terminal.

A Fourth Embodiment

Figure 4:
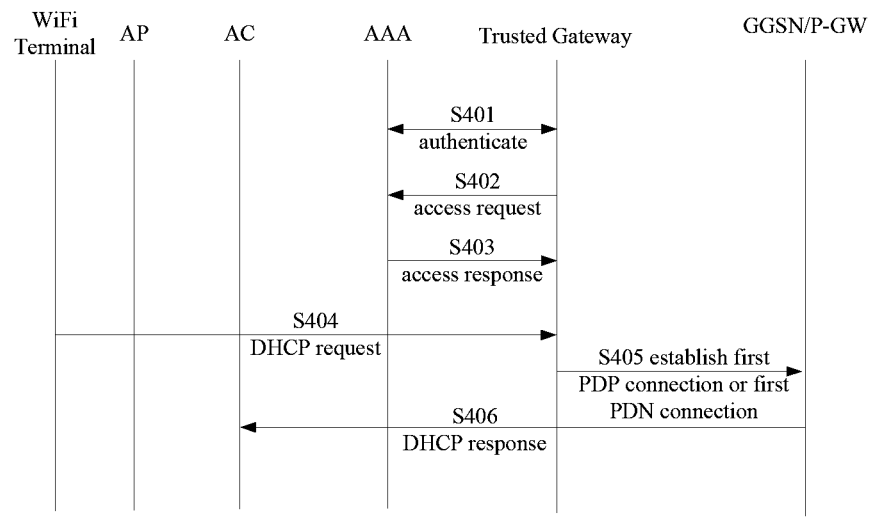
FIG. 4 is a flowchart of another method for WiFi terminal to access PS service domain of a fourth embodiment of the present invention.

The embodiment of the present invention provides a method for a WiFi terminal to access a PS service domain. The following detailed description takes the second generation or the third generation communication network as an example. As shown in FIG. 4, a trusted gateway receives a dynamic host configuration protocol DHCP request message sent by the WiFi terminal, which is used to trigger the trusted gateway to establish a first PDP context connection with a first GGSN. The method includes the processes as follows specifically.

S401, the trusted gateway sends an authentication request message to the AAA server, requesting the AAA server to authenticate the WiFi terminal.

In the method, the trusted gateway is further used to request the AAA server to authenticate the WiFi terminal. The WiFi terminal attaches to the WLAN firstly, and requests the trusted gateway to perform authentication through the AC of the wireless local area network. The trusted gateway sends the authentication request message to the AAA server to request the AAA server to authenticate the WiFi terminal.

S402, after the WiFi terminal is authenticated, the trusted gateway sends an accessing request message to the AAA server.

S403, the trusted gateway receives an accessing response message sent by the AAA server, wherein the accessing response message carries attribute information of the WiFi terminal.

The AAA server receives the accessing request message sent by the trusted gateway, responses to the accessing request message by sending an accessing response message to the trusted gateway, wherein the accessing response message carries the attribute information of the WiFi terminal.

The attribute information of the WiFi terminal includes: a second IP address of the WiFi terminal, an IMSI, a first APN, QoS information of the WiFi terminal and an NAS-ID of the AC which manages the WiFi terminal.

The first APN or the QoS information in the attribute information of the WiFi terminal may be obtained from the AAA server by the trusted gateway, and the AAA server stores the subscription information of the WiFi terminal agreed at the time of subscription with operators. The trusted gateway may also adopt predetermined default values of APN and QoS in establishing the first PDP context connection with the PS service domain for the WiFi terminal to access the PS service domain if no APN and QoS information of the WiFi terminal is agreed at the time of subscription.

S404, the trusted gateway receives a dynamic host configuration protocol DHCP request message sent by the WiFi terminal.

After obtaining the attribute information of the WiFi terminal, the trusted gateway receives the DHCP request message sent by the WiFi terminal, wherein the identification number of the WiFi terminal is encapsulated into the DHCP request message, such as an MAC address or an NAI of the terminal, which is used to identify the WiFi terminal.

S405, the first PDP context connection is established with the first GGSN corresponding to the first access point name, and the first IP address assigned to the WiFi terminal by the first GGSN or the first P-GW is obtained.

The trusted gateway receives the DHCP request message sent by the WiFi terminal, wherein the DHCP request message triggers the trusted gateway to establish the first PDP context connection with the first GGSN. In this way, the trusted gateway determines which GGSN is specifically to establish a connection with, according to the first APN, and then sends a first PDP activation request message to the first GGSN corresponding to the first APN.

The first PDP activation request message carries the attribute information of the WiFi terminal. The attribute information of the WiFi terminal is used to establish the first PDP context connection between the first GGSN and the trusted gateway.

After the first GGSN receives the first PDP activation request message sent by the trusted gateway, the first GGSN assigns the first IP address to the WiFi terminal, wherein the first IP address is used for the WiFi terminal to access the PS service domain. Then, the first GGSN returns a first PDP activation response message to the trusted gateway, wherein the first PDP activation response message carries the first IP address assigned by the first GGSN. Specifically, the first GGSN assigns a corresponding first IP to the WiFi terminal according to the networking. For example, if the AC has a routing function, the first IP address assigned to the WiFi terminal by the first GGSN belongs to the same network segment as the AC which manages the WiFi terminal; and if the AC does not have the routing function, the first GGSN may assign the first IP address to the WiFi terminal without being limited to the same network segment as the AC which manages the WiFi terminal.

The trusted gateway receives the first PDP activation response message returned by the first GGSN, and establishes the correspondence between the session information of the WiFi terminal within the wireless local area network and the session information of the WiFi terminal within the PS service domain, according to the first IP address carried by the first PDP activation response message. That is, the session information of the wireless local area network includes the NAS-ID of the AC which manages the WiFi terminal and so on. The session information of the WiFi terminal within the PS service domain includes: the first IP address and binding GTP tunnel information between the trusted gateway which establishes the first PDP context connection and the first GGSN. The correspondence between the session information of the WiFi terminal within the wireless local area network and the session information of the WiFi terminal within the PS service domain which is established by the trusted gateway is used for routing an uplink data traffic flow initiated by the WiFi terminal to the corresponding PS service domain or routing a downlink data traffic flow sent by the PS service domain towards the WiFi terminal to the WiFi terminal, respectively, according to the correspondence.

S406, after the trusted gateway establishes the first PDP context connection with the PS service domain, the trusted gateway sends a DHCP response message to the WiFi terminal, wherein the DHCP response message carries the first IP address.

Further, after the trusted gateway sends the DHCP response message to the WiFi terminal, the trusted gateway sends an accounting request message to the AAA server to instruct the AAA server to account the WiFi terminal. Responding to the accounting request message, the AAA server opens a CDR.

Specifically, the trusted gateway monitors the condition of the WiFi terminal accessing the PS service domain when the WiFi terminal accesses the PS service domain, and periodically reports the information on traffic, duration and so on of the WiFi terminal accessing the PS service domain to the AAA server. The AAA server accounts the WiFi terminal according to the information on traffic, duration and so on reported by the trusted gateway, updates the CDR, and sends the accounting response message to the trusted gateway.

Further, after the trusted gateway establishes the first PDP context connection, the WiFi terminal is enabled to access the PS service domain via the wireless local area network. When the trusted gateway receives the unlink data traffic flow accessing the PS service domain initiated by the WiFi terminal, the method further includes:

the trusted gateway sending the data packet which bears the uplink data traffic flow to the corresponding PS service domain via the first PDP context connection according to a destination address of the uplink data traffic flow and the first IP address.

For example, when the WiFi terminal accesses an Internet service, after the AC receives a data packet which bears the uplink data traffic flow accessing the Internet service sent by the WiFi terminal, the AC forwards the data packet to the trusted gateway, wherein the data packet carries the information on the destination address of the uplink data traffic flow, the first IP address, the NAS-ID of the AC managing the WiFi terminal and so on. After receiving the data packet which bears the uplink data traffic flow, the trusted gateway routes the data packet to the first GGSN according to the correspondence between the session information of the WiFi terminal within the wireless local area network and the session information of the WiFi terminal within the PS service domain which is established in the trusted gateway, so that the WiFi terminal accesses the corresponding PS service domain.

Correspondingly, when the trusted gateway receives the downlink data traffic flow which is sent to the WiFi terminal by the PS service domain, the method further includes the trusted gateway sending the data packet which bears the downlink data traffic flow to the WiFi terminal according to the first IP address.

Specifically, according to the correspondence between the session information of the WiFi terminal within the wireless local area network and the session information of the WiFi terminal within the PS service domain which is established in the trusted gateway, if the AC has a routing function, the trusted gateway sends the data packet which bears the downlink data traffic flow to the WiFi terminal according to the first IP address, wherein the first IP address and the IP address of the AC which manages the WiFi terminal belongs to the same network segment. If the AC does not have the routing function, the trusted gateway sends the data packet which bears the downlink data traffic flow to the WiFi terminal according to the first IP address and the NAS-ID in the attribute information of the WiFi terminal.

Further, after the trusted gateway establishes the first PDP context connection, and when the trusted gateway receives the unlink data traffic flow accessing the PS service domain initiated by the WiFi terminal, the trusted gateway determines a second access point name of the uplink data traffic flow according to the destination address of the uplink data traffic flow. If a second GGSN corresponding to the second access point name and the first GGSN are not the same device, the trusted gateway establishes a second PDP context connection with the second GGSN, and obtains a third IP address, which is assigned to the WiFi terminal by the second GGSN, for the WiFi terminal to access the PS service domain. The trusted gateway sends the data packet which bears the uplink data traffic flow to the corresponding PS service domain via the second PDP context connection according to the destination address of the unlink data traffic flow and the third IP address.

After the trusted gateway establishes the second PDP context connection, and when the trusted gateway receives, via the second PDP context connection, the downlink data traffic flow sent from the PS service domain to the WiFi terminal, the trusted gateway sends the data packet which bears the downlink data traffic flow to the WiFi terminal according to the second IP address.

Further, when the WiFi terminal initiates an offline request message, or after the WiFi terminal disconnects the communication with the trusted gateway in condition of weak signal, after the trusted gateway sends the accounting termination message to the AAA server, the AAA server closes the CDR file, and responses to the accounting termination message. Meanwhile, the trusted gateway deletes the first PDP context connection.

Further, if the trusted gateway establishes the second PDP context connection, the trusted gateway deletes the second PDP context connection once the trusted gateway receives the accounting termination message.

In order to ensure the security of the WiFi terminal accessing the PS service domain, a tunnel between the AP and the trusted gateway can be configured, wherein the information between the AP and the AC is transmitted via a CAPWAP (Control and Provisioning of Wireless Access Points Protocol Specification) tunnel, and the transmission between the AP and the trusted gateway is performed via a GRE tunnel or a bearer network tunnel.

In the method for WiFi terminal to access PS service domain provided by the embodiment of the present invention, the trusted gateway requests the AAA server to authenticate the WiFi terminal. After the authentication is completed, the trusted gateway obtains the attribute information of the WiFi terminal from the AAA server. After the trusted gateway receives the DHCP request message sent by the WiFi terminal, the trusted gateway establishes the first PDP context connection with the first GGSN or establishes the first PDN connection with the first P-GW, making the trusted gateway to be an access point of the PS service domain, and enabling the WiFi terminal to access the PS service domain via the wireless local area network, the trusted gateway, and the established PDP context connection or the PDN connection. In this way, it is not necessary to establish a specific tunnel between the terminal and the trusted gateway, and the WiFi terminal does not need to be authenticated twice, which lightening the load of the WiFi terminal and reducing the complexity of operation and the cost of the WiFi terminal.

A Fifth Embodiment

Figure 5:
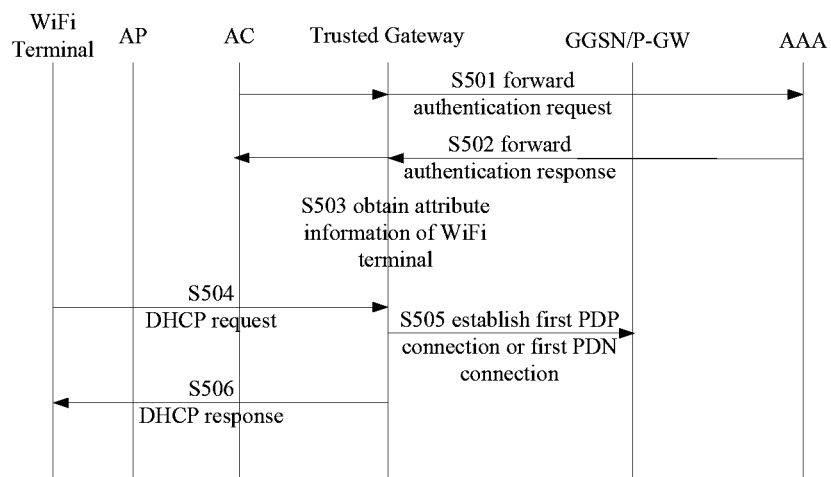
FIG. 5 is a flowchart of another method for WiFi terminal to access PS service domain of a fifth embodiment of the present invention.

The embodiment of the present invention provides a method for a WiFi terminal to access a PS service domain. The following detailed description takes the second generation or the third generation communication network as an example. As shown in FIG. 5, a trusted gateway receives a dynamic host configuration protocol DHCP request message sent by the WiFi terminal, which is used to trigger the trusted gateway to establish the first PDP context connection with the first GGSN. The method includes the processes as follows specifically.

S501, the trusted gateway forwards an authentication request message used for an access controller AC requesting the AAA server to authenticate the WiFi terminal, to the AAA server.

In the present embodiment, the trusted gateway functions as a relay of the AC and the AAA server. The WiFi terminal attaches to the WLAN firstly, and accesses a wireless access point AP of the wireless local area network. The AC sends the authentication request message to the AAA server. As a relay, the trusted gateway forwards the authentication request message sent by the AC to the AAA server.

S502, the trusted gateway forwards an authentication response message resulting from the AAA server authenticating the WiFi terminal, to the AC, wherein the authentication response message carries the attribute information of the WiFi terminal.

After the AAA server authenticates the WiFi terminal successfully, the AAA server sends the authentication response message to the AC. After the trusted gateway receives the authentication response message sent by the AAA server, the trusted gateway forwards the authentication response message to the AC. The authentication response message carries the attribute information of the WiFi terminal.

S503, the trusted gateway obtains the attribute information of the WiFi terminal from the authentication request message.

After the trusted gateway receives the authentication request message sent by the AAA server, the trusted gateway parses the authentication request message sent by the AAA server, and obtains the attribute information of the WiFi terminal.

The attribute information of the WiFi terminal includes: a second IP address of the WiFi terminal, an IMSI, a first APN, a QoS of the WiFi terminal and an NAS-ID.

The first APN or the QoS information in the attribute information of the WiFi terminal may be obtained from the AAA server by the trusted gateway, and the AAA server stores the subscription information of the WiFi terminal agreed at the time of subscription with operators. The trusted gateway may also adopt predetermined default values of APN and QoS in establishing the first PDP context connection with the PS service domain for the WiFi terminal to access the PS service domain if no APN and QoS information of the WiFi terminal is agreed at the time of subscription.

S504, the trusted gateway receives the dynamic host configuration protocol DHCP request message sent by the WiFi terminal.

After obtaining the attribute information of the WiFi terminal, the AC sends the DHCP request message sent by the WiFi terminal to the trusted gateway, wherein the identification number of the WiFi terminal is encapsulated into the DHCP request message, such as an MAC address or an NAI of the terminal, which is used to identify the WiFi terminal.

S505, the first PDP context connection is established with the first GGSN corresponding to the first access point name, and the first IP address assigned to the WiFi terminal by the first GGSN or the first P-GW is obtained.

After receiving the DHCP request message sent by the WiFi terminal, the trusted gateway determines which GGSN is to specifically establish a connection with, according to the first APN in the attribute information of the WiFi terminal, and then sends a first PDP activation request message to the first GGSN corresponding to the first APN.

The first PDP activation request message carries the attribute information of the WiFi terminal. The attribute information of the WiFi terminal is used to establish the first PDP context connection between the first GGSN and the trusted gateway.

After receiving the activation request message sent by the trusted gateway, the first GGSN assigns the first IP address to the WiFi terminal, wherein the first IP address is used for the WiFi terminal to access the PS service domain. Then, the first GGSN returns a first PDP activation response message to the trusted gateway, wherein the first PDP activation response message carries the first IP address assigned by the first GGSN. Specifically, the first GGSN assigns a corresponding first IP to the WiFi terminal according to the networking. For example, if the AC has a routing function, the first IP address assigned to the WiFi terminal by the first GGSN belongs to the same network segment as the AC which manages the WiFi terminal; and if the AC does not have the routing function, then first GGSN may assign the first IP address to the WiFi terminal without being limited to the same network segment as the AC which manages the WiFi terminal.

The trusted gateway receives the first PDP activation response message returned by the first GGSN, and establishes the correspondence between the session information of the WiFi terminal within the wireless local area network and the session information of the WiFi terminal within the PS service domain, according to the first IP address carried by the first PDP activation response message. That is, session information of the wireless local area network includes the NAS-ID of the AC which manages the WiFi terminal and so on; and the session information of the WiFi terminal within the PS service domain includes: the first IP address and binding GTP tunnel information between the trusted gateway which establishes the first PDP context connection and the first GGSN. The correspondence between the session information of the WiFi terminal within the wireless local area network and the session information of the WiFi terminal within the PS service domain which is established by the trusted gateway is used for routing an uplink data traffic flow initiated by the WiFi terminal to the corresponding PS service domain or routing a downlink data traffic flow sent by the PS service domain towards the WiFi terminal to the WiFi terminal, respectively, according to the correspondence.

Further, if the GTP tunnel is established between the trusted gateway and the first GGSN, the PS service domain session information of the WiFi terminal further includes the binding GTP tunnel information between the trusted gateway which establishes the first PDP context connection and the first GGSN.

S506, after the trusted gateway establishes the first PDP context connection with the PS service domain, the trusted gateway sends a DHCP response message to the WiFi terminal, wherein the DHCP response message carries the first IP address.

After the trusted gateway establishes the first PDP context connection, the WiFi terminal is enabled to access the PS service domain via the wireless local area network. When the trusted gateway receives an uplink data traffic flow accessing the PS service domain initiated by the WiFi terminal, the method further includes:

the trusted gateway sending the data packet which bears the uplink data traffic flow to the corresponding PS service domain, via the first PDP context connection, according to the destination address of the uplink data traffic flow and the first IP address.

For example, when the WiFi terminal accesses an Internet service, after receiving a data packet which bears the uplink data traffic flow accessing the Internet service sent by the WiFi terminal, the AC forwards the data packet to the trusted gateway, wherein the data packet carries the information on the destination address of the uplink data traffic flow, the first IP address, the NAS-ID of the AC managing the WiFi terminal and so on. After the trusted gateway receives the data packet which bears the uplink data traffic flow, the trusted gateway routes the data packet to the first GGSN according to the correspondence between the session information of the WiFi terminal within the wireless local area network and the session information of the WiFi terminal within the PS service domain which is established in the trusted gateway, so that the WiFi terminal accesses the corresponding PS service domain.

Correspondingly, when the trusted gateway receives the downlink data traffic flow which is sent to the WiFi terminal by the PS service domain, the method further includes the trusted gateway sending the data packet which bears the downlink data traffic flow to the WiFi terminal according to the first IP address.

Specifically, according to the correspondence between the session information of the WiFi terminal within the wireless local area network and the session information of the WiFi terminal within the PS service domain which is established in the trusted gateway, if the AC has a routing function, the trusted gateway sends the data packet which bears the downlink data traffic flow to the WiFi terminal according to the first IP address, wherein the first IP address and the IP address of the AC which manages the WiFi terminal belongs to the same network segment. If the AC does not have the routing function, the trusted gateway sends the data packet which bears the downlink data traffic flow to the WiFi terminal according to the first IP address and the NAS-ID in the attribute information of the WiFi terminal.

Further, after the trusted gateway establishes the first PDP context connection, and when the trusted gateway receives the unlink data traffic flow accessing the PS service domain initiated by the WiFi terminal, the trusted gateway determines a second access point name of the uplink data traffic flow according to the destination address of the uplink data traffic flow. If a second GGSN corresponding to the second access point name and the first GGSN are not the same device, the trusted gateway establishes a second PDP context connection with the second GGSN, and obtains a third IP address, which is assigned to the WiFi terminal by the second GGSN, for the WiFi terminal to access the PS service domain. The trusted gateway sends the data packet which bears the uplink data traffic flow to the corresponding PS service domain via the second PDP context connection according to the destination address of the unlink data traffic flow and the third IP address.

After the trusted gateway establishes the second PDP context connection, and when the trusted gateway receives, via the second PDP context connection, the downlink data traffic flow sent from the PS service domain to the WiFi terminal, the trusted gateway sends the data packet which bears the downlink data traffic flow to the WiFi terminal according to the second IP address.

Further, the AC monitors the condition of the WiFi terminal accessing the PS service domain when the WiFi terminal accesses the PS service domain, and periodically reports the information on traffic, duration and so on of the WiFi terminal accessing the PS service domain. The AAA server updates the CDR according to the information on traffic, duration and so on reported by the AC, and sends the accounting response message to the AC.

Further, when the WiFi terminal initiates an offline request message, or after the WiFi terminal disconnects the communication with the AC in condition of weak signal, the AC sends the accounting termination message to the AAA server, wherein the trusted gateway forwards the accounting termination message sent by the AC to the AAA server. Meanwhile, the trusted gateway deletes the first PDP context connection between the trusted gateway and the GGSN according to the accounting termination message. After receiving the accounting termination message forwarded by the trusted gateway, the AAA server responses to the accounting termination message, and closes the CDR file.

Further, if the trusted gateway establishes the second PDP context connection, the trusted gateway deletes the second PDP context connection once the trusted gateway receives the accounting termination message.

In order to ensure the security of the WiFi terminal accessing the PS service domain, the information between the trusted gateway and the AP needs to be transmitted via a GRE tunnel or a bearer network tunnel.

In the method for WiFi terminal to access PS service domain provided by the embodiment of the present invention, the trusted gateway functions as a relay between the AC and the AAA server, to obtain the attribute information of the WiFi terminal from the authentication response message sent to the AC of the WiFi terminal from the AAA server. After obtaining the attribute information of the WiFi terminal, the trusted gateway receives the DHCP request message sent by the WiFi terminal, and establishes the first PDP context connection or the first PDN connection between the trusted gateway and the PS service domain, making the trusted gateway to be an access point of the PS service domain, and enabling the WiFi terminal to access the PS service domain via the wireless local area network, the trusted gateway, and the established PDP context connection or the PDN connection. In this way, it is not necessary to establish a specific tunnel between the terminal and the trusted gateway, and the WiFi terminal does not need to be authenticated twice, which lightening the load of the WiFi terminal and reducing the complexity of operation and the cost of the WiFi terminal.

Besides, the second, third, fourth and fifth embodiments provided by the present invention have described the methods for WiFi terminal to access PS service domain provided by the present invention under the second or the third generation communication network system. Certainly, the methods provided by the second, third, fourth and fifth embodiments of the present invention can also be applied in the LTE communication network system wherein, after receiving the accounting request message or the DHCP request message, the trusted gateway establishes a first PDN connection with a first P-GW, and obtains a first IP address assigned to the WiFi terminal by the first PDN, for the WiFi terminal to access the PS service domain. The process of the trusted gateway establishing the PDN connection with the P-GW belongs to the related art, and will not be described redundantly herein.

Further, if a WiFi terminal needs to access a PS service domain of an operator via wireless local area network preferentially, an application on the WiFi terminal needs to send a default access point name type to the WiFi terminal, or the application on the WiFi terminal would not send an access point name to the WiFi terminal while the WiFi terminal accesses the PS service domain via the wireless local area network preferentially according to a default access point name type.

A Sixth Embodiment

Figure 6:
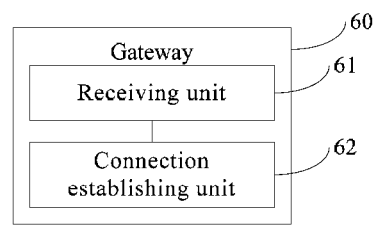
FIG. 6 is a structure diagram of a trusted gateway for WiFi terminal to access PS service domain of a sixth embodiment of the present invention.

A embodiment of the present invention provides a trusted gateway 60 for a WiFi terminal to access a PS service domain, as shown in FIG. 6, including a receiving unit 61 and a connection establishing unit 62.

The receiving unit 61 is configured to receive an accounting request message sent by an authentication, authorization and accounting AAA server or a dynamic host configuration protocol DHCP request message sent by the WiFi terminal.

The connection establishing unit 62 is configured to establish a first packet data protocol PDP context connection or a first packet data network PDN connection with the PS service domain according to attribute information of the WiFi terminal after the receiving unit 61 receives the accounting request message or the DHCP request message, making the trusted gateway to be an access point for accessing the PS service domain, and enabling the WiFi terminal to access the PS service domain via the trusted gateway after accessing, without a tunnel, to the trusted gateway via the wireless local area network.

Figure 7:
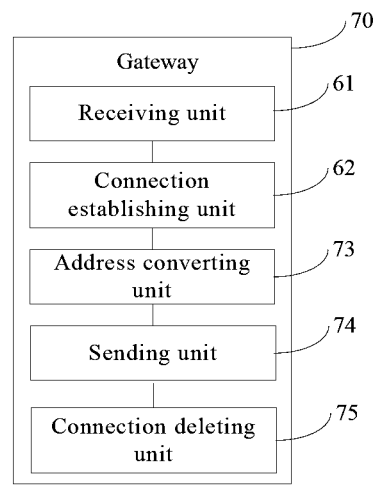
FIG. 7 is a structure diagram of another trusted gateway for WiFi terminal to access PS service domain of a sixth embodiment of the present invention.

If what is received by the receiving unit 61 is the accounting request message sent by the AAA server, the accounting request message is used to trigger the trusted gateway to establish the first PDP context connection or the first PDN connection with the PS service domain. As shown in FIG. 7, the trusted gateway 70 may further include an address converting unit 73, a sending unit 74 and a connection deleting unit 75.

During the process of the WiFi terminal accessing the wireless local area network, the WiFi terminal accesses an AC through an AP, and the AC requests the AAA server to authenticate the WiFi terminal, wherein the specific authentication mode may be the EAP-SIM/AKA authentication or the Portal authentication. After the authentication is completed, the AC requests a BRAS or other IP address assignment server to assign a second IP address within the wireless local area network to the WiFi terminal. After assigning the second IP address to the WiFi terminal, the AC sends the accounting request message to the AAA server to request the AAA server to start accounting the WiFi terminal. Responding to the accounting request message sent by the AC, the AAA server opens a CDR (calling detail records, calling detail records). Then, the AAA server encapsulates the attribute information of the WiFi terminal into the account request message, and sends to the receiving unit 61 of the trusted gateway the accounting request message which carries the attribute information of the WiFi terminal. The attribute information of the WiFi terminal is carried in the accounting request message.

The attribute information of the WiFi terminal includes: the second IP address of the WiFi terminal, an IMSI, a first APN, QoS information of the WiFi terminal and an NAS-ID.

The first APN or the QoS information in the attribute information of the WiFi terminal may be obtained from the AAA server by the trusted gateway, and the AAA server stores the subscription information of the WiFi terminal agreed at the time of subscription with operators. The trusted gateway may also adopt predetermined default values of APN and QoS in establishing the first PDP context connection or the first PDN connection with the PS service domain for the WiFi terminal accessing the PS service domain if no APN and QoS information of the WiFi terminal is agreed at the time of subscription.

The connection establishing unit 62 is configured to establish the first PDP context connection with the first GGSN corresponding to the first access point name or the first PDN connection with the P-GW corresponding to the first access point name, and obtain the first IP address assigned to the WiFi terminal by the first GGSN or the first P-GW.

The sending unit 74 is configured to send an accounting request response message to the access controller AC through the AAA server after the connection establishing unit 62 establishes the first PDP context connection or the first PDN connection, wherein the accounting request response message carries the first IP address, which enables the WiFi terminal to access the PS service domain via the wireless local area network.

Specifically, in the second generation or the third generation communication network, the connection establishing unit 62 is specifically configured to send a first PDP activation request message to the first GGSN corresponding to the first access point name, receive a first PDP activation response message returned by the first GGSN, wherein the first PDP activation response message carries the first IP address which is assigned to the WiFi terminal by the first GGSN, for the WiFi terminal accessing the PS service domain. For example, after the receiving unit 61 of the trusted gateway receives the accounting request message sent by the AAA server, the trusted gateway is triggered to establish the first PDP context connection with the first GGSN. First, the connection establishing unit 62 of the trusted gateway addresses the corresponding first GGSN according to the first APN information. For example, if the first APN is CMNET specifically, the trusted gateway addresses the GGSN accessing the Internet. Then, the connection establishing unit 62 sends the first PDP activation request message to the first GGSN, to establish the first PDP context connection between the WiFi terminal and the first GGSN. The first PDP activation request message carries the attribute information of the WiFi terminal, which is used to establish the first PDP context connection between the first GGSN and the trusted gateway. After receiving the first activation request message sent by the connection establishing unit 62, the first GGSN assigns the first IP address to the WiFi terminal, wherein the first IP address is used for the WiFi terminal to access the PS service domain. Then, the first GGSN returns the first PDP activation response message to the trusted gateway, wherein the first PDP activation response message carries the first IP address assigned by the first GGSN. After the connection establishing unit 62 receives the first PDP activation response message returned by the first GGSN, the trusted gateway establishes, according to the first IP address carried by the first PDP activation response message, the correspondence between the session information of the WiFi terminal within the wireless local area network and the session information of the WiFi terminal within the PS service domain. The session information of the wireless local area network includes the second IP address of the WiFi terminal, the NAS-ID of the AC which manages the WiFi terminal and so on. The session information of the WiFi terminal within the PS service domain includes the first IP address and binding GTP tunnel information between the trusted gateway which establishes the first PDP context connection and the first GGSN. The correspondence between the session information of the WiFi terminal within the wireless local area network and the session information of the WiFi terminal within the PS service domain which is established by the trusted gateway is used for routing an uplink data traffic flow initiated by the WiFi terminal to the corresponding PS service domain or routing a downlink data traffic flow sent by the PS service domain towards the WiFi terminal to the WiFi terminal, respectively, according to the correspondence.

Further, when the WiFi terminal accesses the PS service domain, the address converting unit 73 is configured to convert the second IP address, which is carried by a data packet which bears the uplink data traffic flow initiated by the WiFi terminal, into the first IP address, and further configured to convert the first IP address, which is carried by a data packet which bears the downlink data traffic flow sent towards the WiFi terminal by the PS service domain, into the second IP address, wherein the second IP address is the IP address of the wireless local area network assigned to the WiFi terminal by an access controller AC after the AC authenticates the WiFi terminal.

The sending unit 74 is further configured to send the data packet which bears the uplink data traffic flow to the corresponding PS service domain via the first PDP context connection or the first PDN connection according to the destination address of the uplink data traffic flow and the first IP address, and is further configured to send the data packet which bears the downlink data traffic flow to the WiFi terminal according to the second IP address.

For example, in the second generation or the third generation communication network, when the WiFi terminal accesses an Internet service, the AC forwards the uplink data traffic flow to the trusted gateway after the AC receives the uplink data traffic flow accessing the Internet service initiated by the WiFi terminal. The address converting unit 73 converts the second IP address carried by the uplink data traffic flow into the first IP address, according to the correspondence between the session information of the WiFi terminal within the wireless local area network and the session information of the WiFi terminal within the PS service domain which is established in the trusted gateway. Then, the sending unit 74 sends the data packet which bears the uplink data traffic flow to the corresponding PS service domain via the first PDP context connection according to the destination address of the uplink data traffic flow and the IP address.

Correspondingly, when the trusted gateway receives the downlink data traffic flow sent towards the WiFi terminal by the PS service domain, the address converting unit 73 converts the first IP address, which is carried by the data packet which bears the downlink data traffic flow, into the second IP address according to the correspondence between the session information of the WiFi terminal within the wireless local area network and the session information of the WiFi terminal within the PS service domain which is established in the trusted gateway. The sending unit sends the data packet which bears the downlink data traffic flow to the WiFi terminal according to the second IP address and/or a serial number of the user accessing server.

Further, when the WiFi terminal accesses the PS service domain, the connection establishing unit 62 determines a second access point name corresponding to the uplink data traffic flow according to the destination address of the uplink data traffic flow. If a second GGSN corresponding to the second access point name and the first GGSN are not the same device or a second P-GW corresponding to the second access point name and the first P-GW are not the same device, a second PDP context connection with the second GGSN or a second PDN connection with the second P-GW is established, and a third IP address, which is assigned to the WiFi terminal by the second GGSN or the second P-GW for accessing the PS service domain is obtained.

The address converting unit 73 is further configured to convert the second IP address, which is carried by the data packet which bears the uplink data traffic flow, into the third IP address after the trusted gateway establishes the second PDP context connection or the second PDN connection, and is further configured to convert the third IP address, which is carried by the data packet which bears the downlink data traffic flow, into the second IP address.

The sending unit 74 is further configured to send the data packet which bears the uplink data traffic flow to the corresponding PS service domain according to the destination address of the uplink data traffic flow and the third IP address via the second PDP context connection or the second PDN connection, and send, according to the second IP address, to the WiFi terminal the data packet of the downlink data traffic flow, which is sent towards the WiFi terminal by the PS service domain, and received via the second PDP context connection or the second PDN connection.

Further, after the WiFi terminal goes offline, the receiving unit 61 is further configured to receive an accounting termination message sent by the AAA server. The connection deleting unit 75 is configured to delete the first PDP context connection of the first PDN connection after the receiving unit 61 receives the accounting deleting message.

Specifically, the AC monitors the condition of the WiFi terminal accessing the PS service domain when the WiFi terminal accesses the PS service domain, and periodically reports the information on traffic, duration and so on of the WiFi terminal accessing the PS service domain. The AAA server updates the CDR according to the information on traffic, duration and so on reported by the AC, and sends the accounting response message to the AC. When the WiFi terminal initiates the offline request message, or after the WiFi terminal disconnects the communication with the AC in condition of weak signal, after the AC sends the accounting termination message to the AAA server, the AAA server closes the CDR file, and responses to the accounting termination message by sending the accounting termination message to the trusted gateway. After the receiving unit 61 receives the accounting termination message, the connection deleting unit 75 deletes the first PDP context connection or the first PDN connection.

Further, if the trusted gateway establishes the second PDP context connection or the second PDN connection, after the receiving unit 61 receives the accounting termination message, the connection deleting unit 75 deletes the second PDP context connection or the second PDN connection at the same time.

Figure 8:
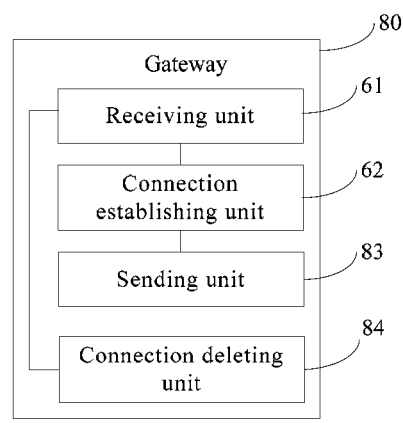
FIG. 8 is a structure diagram of another trusted gateway for WiFi terminal to access PS service domain of a sixth embodiment of the present invention.

If what is received by the receiving unit 61 is the DHCP request message sent by the WiFi terminal, as shown in FIG. 8, the trusted gateway 80 may further include a sending unit 83 and a connection deleting unit 84.

Before sending the DHCP request message to the trusted gateway through the AC, the WiFi terminal needs to attach to the WLAN firstly, and request to be authenticated by the AAA server through the AC. After the authentication of the WiFi terminal is completed, the WiFi terminal may send the DHCP request message to the trusted gateway via the AC. The AC sends the DHCP request message to the trusted gateway, and encapsulates an identification number of the WiFi terminal, such as an MAC (Media Access Control) address or an NAI (Network Access Identifier) of the WiFi terminal, which is used to identify the WiFi terminal, in the DHCP request message sent by the WiFi terminal.

The sending unit 83 is configured to send the accessing request message to the AAA server after the receiving unit 61 receives the DHCP request message.

The receiving unit 61 of the trusted gateway receives the DHCP request message sent by the WiFi terminal through the AC, wherein the DHCP request message triggers the trusted gateway to establish the first PDP context connection or the first PDN connection with the PS service domain. In this way, the trusted gateway needs to obtain the attribute information of the WiFi terminal from the AAA server first. Specifically, the sending unit 83 sends an accessing request message to the AAA server to obtain the attribute information of the WiFi terminal.

The receiving unit 61 is further configured to receive the accessing response message sent by the AAA server, wherein the accessing response message carries the attribute information of the WiFi terminal.

The AAA server receives the accessing request message sent by the trusted gateway and responses to the accessing request message by sending the accessing response message to the trusted gateway, wherein the accessing response message carries the attribute information of the WiFi terminal.

The attribute information of the WiFi terminal includes: a second IP address of the WiFi terminal, an IMSI, a first APN, WiFi terminal QoS information and an NAS-ID of the AC which manages the WiFi terminal.

The first APN or the QoS information in the attribute information of the WiFi terminal may be obtained from the AAA server by the trusted gateway and the AAA server stores the subscription information of the WiFi terminal agreed at the time of subscription with operators. The trusted gateway may also adopt predetermined default values of APN and QoS in establishing the first PDP context connection or the first PDN connection with the PS service domain for the WiFi terminal accessing the PS service domain if no APN and QoS information of the WiFi terminal is agreed at the time of subscription s.

The connection establishing unit 62 is configured to establish a first PDP context connection with the first GGSN corresponding to the first access point name or a first PDN connection with the P-GW corresponding to the first access point name, and obtain the first IP address assigned to the WiFi terminal by the first GGSN or the first P-GW.

The sending unit 83 is configured to send the DHCP response message to the WiFi terminal after the connection establishing unit 62 establishes the first PDP context connection or the first PDN connection, wherein the DHCP response message carries the first IP address.

Specifically, in the second generation or the third generation communication network, after the receiving unit 61 receives the accessing response message sent by the AAA server, the connection establishing unit 62 is further configured to send a first PDP activation request message to the first GGSN corresponding to the first access point name, receive a first PDP activation response message returned by the first GGSN, wherein the first PDP activation response message carries the first IP address which is assigned to the WiFi terminal by the first GGSN, for the WiFi terminal to access the PS service domain. For example, the trusted gateway determines which GGSN is specifically to establish a connection with, according to the first APN, and sends a first PDP activation request message to the first GGSN corresponding to the first APN. The first PDP activation request message carries the attribution information of the WiFi terminal, which is used for the first GGSN to establish the first PDP context connection with the trusted gateway.

After receiving the first PDP activation request message sent by the trusted gateway, the first GGSN assigns the first IP address to the WiFi terminal, wherein the first IP address is used for the WiFi terminal to access the PS service domain. Then, the first GGSN returns the first PDP activation response message to the trusted gateway, wherein the first PDP activation response message carries the first IP address assigned by the first GGSN. Specifically, the first GGSN assigns a corresponding first IP to the WiFi terminal according to the networking. For example, if the AC has a routing function, the first IP address assigned to the WiFi terminal by the first GGSN belongs to the same network segment as the AC which managing the WiFi terminal, if the AC does not have the routing function, then first GGSN assign the first IP address to the WiFi terminal without being limited to the same network segment as the AC which manages the WiFi terminal. The connection establishing unit 62 receives the first PDP activation response message returned by the first GGSN, wherein the trusted gateway establishes, according to the first IP address carried by the first PDP activation response message, the correspondence between the session information of the WiFi terminal within the wireless local area network and the session information of the WiFi terminal within the PS service domain. That is, the session information of the wireless local area network includes the NAS-ID of the AC which manages the WiFi terminal and so on. The PS service domain session information of the WiFi terminal includes the first IP address and binding GTP tunnel information between the trusted gateway which establishes the first PDP context connection and the first GGSN. The correspondence between the session information of the WiFi terminal within the wireless local area network and the session information of the WiFi terminal within the PS service domain which is established by the trusted gateway is used for routing an uplink data traffic flow initiated by the WiFi terminal to the corresponding PS service domain or routing a downlink data traffic flow sent by the PS service domain towards the WiFi terminal to the WiFi terminal, respectively, according to the correspondence.

Further, after the connection establishing unit 62 establishes the first PDP context connection or the first PDN connection, the sending unit 83 is further configured to send an accounting request message to the AAA server to instruct the AAA server to account the WiFi terminal.

Further, after the trusted gateway establishes the first PDP context connection or the first PDN connection with the PS service domain, when the WiFi terminal accesses the PS service domain, the sending unit 83 is further configured to send the data packet which bears the uplink data traffic flow to the corresponding PS service domain according to the destination address of the uplink data traffic flow and the first IP address which are carried by the data packet which bears the uplink data traffic flow initiated by the WiFi terminal via the first PDP context connection or the first PDN connection. The sending unit 83 is further configured to send the data packet which bears the downlink data traffic flow which is sent towards the WiFi terminal by the PS service domain, to the WiFi terminal according to the first IP address.

For example, in the second generation or the third generation communication network system, when the WiFi accesses the Internet service, the AC forwards the data packet to the trusted gateway after receiving the data packet which bears the uplink data traffic flow which accesses the Internet service sent by the WiFi terminal, wherein the data packet carries the information on the destination address of the uplink data traffic flow, the first IP address, the NAS-ID of the AC which manages the WiFi terminal and so on. After the trusted gateway receives the data packet which bears the uplink data traffic flow, the sending unit 83 routes the data packet to the first GGSN according to the correspondence between the session information of the WiFi terminal within the wireless local area network and the session information of the WiFi terminal within the PS service domain which is established in the trusted gateway, so that the WiFi terminal accesses the corresponding PS service domain.

Correspondingly, when the trusted gateway receives the downlink data traffic flow which is sent to the WiFi terminal by the PS service domain, according to the correspondence between the session information of the WiFi terminal within the wireless local area network and the session information of the WiFi terminal within the PS service domain which is established in the trusted gateway, if the AC has a routing function, the sending unit 83 sends the data packet which bears the downlink data traffic flow to the WiFi terminal according to the first IP address, wherein the first IP address and the IP address of the AC which manages the WiFi terminal belongs to the same network segment. If the AC does not have the routing function, the sending unit 83 sends the data packet which bears the downlink data traffic flow to the WiFi terminal according to the first IP address and the NAS-ID in the attribute information of the WiFi terminal.

Further, when the WiFi terminal accesses the PS service domain, the connection establishing unit 62 is further configured to determine a second access point name corresponding to the uplink data traffic flow according to the destination address of the uplink data traffic flow. If a second GGSN corresponding to the second access point name and the first GGSN are not the same device, or a second P-GW corresponding to the second access point name and the first P-GW are not the same device, the connection establishing unit 62 is further configured to establish a second PDP context connection with the second GGSN or a second PDN connection with the second P-GW, and obtain a third IP address, which is assigned to the WiFi terminal by the second GGSN for accessing the PS service domain.

The sending unit 83 is further configured to send, via the second PDP context connection, the data packet which bears the uplink data traffic flow to the corresponding PS service domain according to the destination address of the uplink data traffic flow and the third IP address. The sending unit 83 is further configured to send, according to the third IP address, to the WiFi terminal the data packet which bears the downlink data traffic flow received via the second PDP context connection or the second PDN connection and sent towards the WiFi terminal by the PS service domain.

Further, after the WiFi terminal goes offline, the receiving unit 61 is further configured to receive the accounting termination message sent by the AAA server. The connection deleting unit 84 is configured to delete the first PDP context connection or the first PDN connection after the receiving unit 61 receives the accounting termination message.

Further, if the trusted gateway establishes the second PDP context connection or the second PDN connection, the connection deleting unit 84 deletes the second PDP context connection or the second PDN connection at the same time after the receiving unit 61 receives the accounting termination message.

Specifically, the AC monitors the condition of the WiFi terminal accessing the PS service domain when the WiFi terminal accesses the PS service domain, and periodically reports the information on traffic, duration and so on of the WiFi terminal accessing the PS service domain. The AAA server updates CDR according to the information on traffic, duration and so on reported by the AC, and sends the accounting response message to the AC. When the WiFi terminal initiates the offline request message, or after the WiFi terminal disconnects the communication with the AC in condition of weak signal, after the AC sends the accounting termination message to the AAA server, the AAA server closes the CDR file, and responses to the accounting termination message by sending the accounting termination message to the trusted gateway. After the receiving unit 61 receives the accounting termination message, the connection deleting unit 84 deletes the first PDP context connection or the first PDN connection.

If what is received by the receiving unit 61 is the DHCP request message sent by the WiFi terminal, as shown in FIG. 8, the sending unit 83 is configured to send an authentication request message to the AAA server to request the AAA server to authenticate the WiFi terminal.

The receiving unit 61 is further configured to receive the accessing response message sent by the AAA server, wherein the accessing response message carries the attribute information of the WiFi terminal.

The AAA server receives the accessing request message sent by the sending unit 83, responses to the accessing request message by sending the accessing response message to the trusted gateway, wherein the accessing response message carries the attribute information of the WiFi terminal.

The attribute information of the WiFi terminal includes: the second IP address of the WiFi terminal, an IMSI, the first APN, QoS information of the WiFi terminal and an NAS-ID of the AC managing the WiFi terminal.

The first APN or the QoS information in the attribute information of the WiFi terminal may be obtained from the AAA server by the trusted gateway, and the AAA server stores the subscription information of the WiFi terminal agreed at the time of subscription with operators. The trusted gateway may also adopt predetermined default values of APN and QoS in establishing the first PDP context connection or the first PDN connection with the PS service domain for the WiFi terminal accessing the PS service domain if no APN and QoS information of the WiFi terminal is agreed at the time of subscription.

After obtaining the attribute information of the WiFi terminal, the receiving unit 61 receives the DHCP request message sent by the WiFi terminal through the AC. The AC sends the DHCP request message to the trusted gateway, wherein an identification number of the WiFi terminal is encapsulated into the DHCP request message, such as an MAC address or an NAI of the terminal. The trusted gateway is triggered to establish the first PDP context connection or the first PDN connection after receiving the DHCP request message.

The connection establishing unit 62 is configured to establish the first PDP context connection with the first GGSN corresponding to the first access point name or the first PDN connection with the P-GW corresponding to the first access point name, and obtain the first IP address assigned to the WiFi terminal by the first GGSN or the first P-GW.

The sending unit 83 is configured to a DHCP response message to the WiFi terminal after the connection establishing unit establishes the first PDP context connection or the first PDN connection, wherein the DHCP response message carries the first IP address.

Specifically, in the second generation or the third generation communication network, the connection establishing unit 62 is further configured to send a first PDP activation request message to the first GGSN corresponding to the first access point name, and receive a first PDP activation response message returned by the first GGSN, wherein the first PDP activation response message carries the first IP address, which is assigned to the WiFi terminal by the first GGSN for the WiFi terminal to access the PS service domain. For example, the connection establishing unit 62 determines which GGSN the trusted gateway specifically needs to establish a connection with, according to the first APN, and sends a first PDP activation request message to the first GGSN corresponding to the first APN. The first PDP activation request message carries the attribution information of the WiFi terminal, which is used for the first GGSN to establish the first PDP context connection with the trusted gateway. After receiving the first PDP activation request message sent by the trusted gateway, the first GGSN assigns the first IP address to the WiFi terminal, wherein the first IP address is used for the WiFi terminal to access the PS service domain. Then, the first GGSN returns the first PDP activation response message to the trusted gateway, wherein the first PDP activation response message carries the first IP address assigned by the first GGSN. Specifically, the first GGSN assigns a corresponding first IP to the WiFi terminal according to the networking. For example, if the AC has a routing function, the first IP address assigned to the WiFi terminal by the first GGSN belongs to the same network segment as the AC which managing the WiFi terminal, and if the AC does not have the routing function, the first GGSN may assign the first IP address to the WiFi terminal without being limited to the same network segment as the AC which manages the WiFi terminal. The connection establishing unit 62 receives the first PDP activation response message returned by the first GGSN, wherein the trusted gateway establishes, according to the first IP address carried by the first PDP activation response message, the correspondence between the session information of the WiFi terminal within the wireless local area network and the session information of the WiFi terminal within the PS service domain. That is, the session information of the wireless local area network includes the NAS-ID of the AC which manages the WiFi terminal and so on. The PS service domain session information of the WiFi terminal includes the first IP address and binding GTP tunnel information between the trusted gateway which establishes the first PDP context connection and the first GGSN. The correspondence between the session information of the WiFi terminal within the wireless local area network and the session information of the WiFi terminal within the PS service domain which is established by the trusted gateway is used for routing an uplink data traffic flow initiated by the WiFi terminal to the corresponding PS service domain or routing a downlink data traffic flow sent by the PS service domain towards the WiFi terminal to the WiFi terminal, respectively, according to the correspondence.

Further, after the connection establishing unit 62 establishes the first PDP context connection or the first PDN connection, the sending unit 83 is further configured to send the accounting request message to the AAA server to instruct the AAA server to account the WiFi terminal.

Specifically, the trusted gateway monitors the condition of the WiFi terminal accessing the PS service domain when the WiFi terminal accesses the PS service domain, and periodically reports the information on traffic, duration and so on of the WiFi terminal accessing the PS service domain to the AAA server. The AAA server accounts the WiFi terminal according to the information on traffic, duration and so on reported by the trusted gateway, updates the CDR, and sends the accounting response message to the trusted gateway.

Further, when the WiFi terminal accesses the PS service domain, the sending unit 83 sends, via the first PDP context connection of the first PDN connection, the data packet which bears the uplink data traffic flow to the corresponding PS service domain according to the destination address of the uplink data traffic flow and the first IP address carried by the data packet which bears the uplink data traffic flow initiated by the WiFi terminal. The sending unit 83 is further configured to send the data packet which bears the downlink data traffic flow sent towards the WiFi terminal by the PS service domain, to the WiFi terminal according to the first IP address.

For example, in the second generation or the third generation communication network, when the WiFi terminal accesses an Internet service, after the AC receives a data packet which bears an uplink data traffic flow accessing the Internet service initiated by the WiFi terminal, the AC forwards the data packet to the trusted gateway, wherein the data packet carries the information on destination address of the uplink data traffic flow, the first IP address, the NAS-ID of the AC manages the WiFi terminal and so on. After receiving the data packet which bears the uplink data traffic flow, the sending unit 83 of the trusted gateway routes the data packet to the first GGSN according to the correspondence between the session information of the WiFi terminal within the wireless local area network and the session information of the WiFi terminal within the PS service domain which is established in the trusted gateway, so that the WiFi terminal accesses the corresponding PS service domain.

Correspondingly, when the trusted gateway receives the downlink data traffic flow sent towards the WiFi terminal by the PS service domain, according to the c correspondence between the session information of the WiFi terminal within the wireless local area network and the session information of the WiFi terminal within the PS service domain which is established in the trusted gateway, if the AC has a routing function, the sending unit 83 sends the data packet which bears the downlink data traffic flow to the WiFi terminal according to the first IP address, wherein the first IP address and the IP address of the AC which manages the WiFi terminal belongs to the same network segment. If the AC does not have the routing function, the sending unit 83 sends the data packet which bears the downlink data traffic flow to the WiFi terminal according to the first IP address and the NAS-ID in the attribute information of the WiFi terminal.

Further, when the WiFi terminal accesses the PS service domain, the connection establishing unit 62 is further configured to determine a second access point name corresponding to the uplink data traffic flow according to the destination address of the uplink data traffic flow. If a second GGSN corresponding to the second access point name and the first GGSN are not the same device or a second P-GW corresponding to the second access point name and the first P-GW are not the same device, a second PDP context connection with the second GGSN or a second PDN connection with the second P-GW is established, and a third IP address, which is assigned to the WiFi terminal by the second GGSN or the second P-GW for accessing the PS service domain is obtained.

The sending unit 83 is further configured to send the data packet which bears the uplink data traffic flow to the corresponding PS service domain via the second PDP context connection or the second PDN connection, according to the destination address of the uplink data traffic flow and the third IP address, and send, according to the third IP address, to the WiFi terminal the data packet of the downlink data traffic flow, which is sent to the WiFi terminal by the PS service domain and received via the second PDP context connection or the second PDN connection.

Further, the sending unit 83 is further configured to send an accounting termination message to the AAA server when the WiFi terminal goes offline.

The connection deleting unit 84 is configured to delete the first PDP context connection or the first PDN connection after the sending unit sends the accounting termination message to the AAA server.

Further, if the trusted gateway establishes the second PDP context connection or the second PDN connection, the connection deleting unit 84 deletes the second PDP context connection or the second PDN connection at the same time after the sending unit 83 sends the accounting termination message to the AAA server.

Specifically, when the WiFi terminal initiates the offline request message, or after the WiFi terminal disconnects the communication with the trusted gateway in condition of weak signal, after the sending unit 83 sends the accounting termination message to the AAA server, the AAA server closes the CDR file, and responses to the accounting termination message. Meanwhile, the connection deleting unit 84 deletes the first PDP context connection or the first PDN connection.

Figure 9:
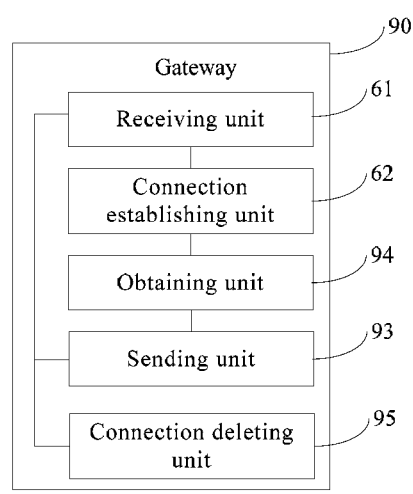
FIG. 9 is a structure diagram of another trusted gateway for WiFi terminal to access PS service domain of a sixth embodiment of the present invention.

When what is received by the receiving unit 61 is the DHCP request message sent by the WiFi terminal, the DHCP request message is used to trigger the trusted gateway to establish the first PDP context connection or the first PDN connection with the PD service domain. As shown in FIG. 9, the trusted gateway 90 may further includes a sending unit 93, an obtaining unit 94 and a connection deleting unit 95.

The sending unit 93 is configured to forward an authentication request message, used for an access controller AC requesting the AAA server to authenticate the WiFi terminal, to the AAA server, and is further configured to forward to the AC an authentication response message resulting from the AAA server authenticating the WiFi terminal, wherein the authentication response message carries the attribute information of the WiFi terminal.

The trusted gateway in the present invention functions as a relay between the AC and the AAA server. Firstly, the WiFi terminal attaches to the WLAN, and accesses a wireless access point of the wireless local area network. The AC sends the authentication request message to the AAA server. As the relay, the sending unit 93 of the trusted gateway forwards the authentication request message sent by the AC to the AAA server.

After the AAA server successfully authenticates the WiFi terminal, the AAA server sends the authentication response message to the AC. After the receiving unit 61 of the trusted gateway receives the authentication response message sent by the AAA server, the sending unit 93 forwards the authentication response message to the AC, wherein the authentication response message carries the attribute information of the WiFi terminal.

The obtaining unit 94 is configured to obtain the attribute information of the WiFi terminal from the authentication response message.

After the receiving unit 61 of the trusted gateway receives the authentication response message sent by the AAA server, the obtaining unit 94 of the trusted gateway parses the authentication response message sent by the AAA server, and obtains the attribute information of the WiFi terminal from the authentication response message. The attribute information of the WiFi terminal includes: a second IP address of the WiFi terminal, an IMSI, a first APN, QoS of the WiFi terminal and an NAS-ID.

The first APN or the QoS information in the attribute information of the WiFi terminal may be obtained from the AAA server by the trusted gateway, and the AAA server stores the subscription information of the WiFi terminal agreed at the time of subscription with operators. The trusted gateway may also adopt predetermined default values of APN and QoS in establishing the first PDP context connection or the first PDN connection with the PS service domain for the WiFi terminal accessing the PS service domain if no APN and QoS information of the WiFi terminal is agreed at the time of subscription.

The connection establishing unit 62 is configured to establish a first PDP context connection with the first GGSN corresponding to the first access point name or a first PDN connection with the P-GW corresponding to the first access point name, and obtain the first IP address assigned to the WiFi terminal by the first GGSN or the first P-GW.

The sending unit 83 is further configured to send a DHCP response message to the WiFi terminal after the connection establishing unit establishes the first PDP context connection or the first PDN connection, wherein the DHCP response message carries the first IP address.

Specifically, in the second generation or the third generation communication network, the connection establishing unit 62 is further configured to send a first PDP activation request message to the first GGSN corresponding to the first access point name, receive a first PDP activation response message returned by the first GGSN, wherein the first PDP activation response message carries the first IP address which is assigned to the WiFi terminal by the first GGSN for the WiFi terminal to access the PS service domain, and send the DHCP response message to the WiFi terminal, wherein the DHCP response message carries the first IP address. For example, the connection establishing unit 62 determines, according to the first APN, which GGSN the trusted gateway specifically needs to establish a connection with, and sends a first PDP activation request message to the first GGSN corresponding to the first APN. The first PDP activation request message carries the attribution information of the WiFi terminal, which is used for the first GGSN to establish the first PDP context connection with the trusted gateway. After receiving the activation request message sent by the trusted gateway, the first GGSN assigns the first IP address to the WiFi terminal, wherein the first IP address is used for the WiFi terminal to access the PS service domain. Then, the first GGSN returns the first PDP activation response message to the trusted gateway, wherein the first PDP activation response message carries the first IP address assigned by the first GGSN. Specifically, the first GGSN assigns a corresponding first IP to the WiFi terminal according to the networking. For example, if the AC has a routing function, the first IP address assigned to the WiFi terminal by the first GGSN belongs to the same network segment as the AC which manages the WiFi terminal, and if the AC does not have the routing function, the first GGSN may assign the first IP address to the WiFi terminal without being limited to the same network segment as the AC which manages the WiFi terminal. The connection establishing unit 62 receives the first PDP activation response message returned by the first GGSN, wherein the trusted gateway establishes, according to the first IP address carried by the first PDP activation response message, the correspondence between the session information of the WiFi terminal within the wireless local area network and the session information of the WiFi terminal within the PS service domain. That is, the session information of the wireless local area network includes the NAS-ID of the AC which manages the WiFi terminal and so on. The PS service domain session information of the WiFi terminal includes the first IP address and binding GTP tunnel information between the trusted gateway which establishes the first PDP context connection and the first GGSN. The correspondence between the session information of the WiFi terminal within the wireless local area network and the session information of the WiFi terminal within the PS service domain which is established by the trusted gateway is used for routing an uplink data traffic flow initiated by the WiFi terminal to the corresponding PS service domain or routing a downlink data traffic flow sent by the PS service domain towards the WiFi terminal to the WiFi terminal, respectively, according to the correspondence.

Further, after the trusted gateway establishes the first PDP context connection or the first PDN connection with the PS service domain, when the WiFi terminal accesses the PS service domain, the sending unit 93 is configured to send the data packet which bears the uplink data traffic flow to the corresponding PS service domain via the first PDP context connection or the first PDN connection, according to the destination address of the uplink data traffic flow and the first IP address carried by the data packet which bears the uplink data traffic flow initiated by the WiFi terminal. The sending unit 93 is further configured to send the data packet which bears the downlink data traffic flow which is sent towards the WiFi terminal by the PS service domain, to the WiFi terminal according to the first IP address.

For example, in the second generation or the third generation communication network system, when the WiFi accesses an Internet service, after the AC receives a data packet which bears an uplink data traffic flow accessing the Internet service sent by the WiFi terminal, the AC forwards the data packet to the trusted gateway, wherein the data packet carries the information on the destination address of the uplink data traffic flow, the first IP address, the NAS-ID of the AC which manages the WiFi terminal and so on. After the trusted gateway receives the data packet which bears the uplink data traffic flow, the sending unit 93 routes the data packet to the first GGSN according to the correspondence between the session information of the WiFi terminal within the wireless local area network and the session information of the WiFi terminal within the PS service domain which is established in the trusted gateway, so that the WiFi terminal accesses the corresponding PS service domain.

Correspondingly, when the trusted gateway receives the downlink data traffic flow which is sent towards the WiFi terminal by the PS service domain, according to the correspondence between the session information of the WiFi terminal within the wireless local area network and the session information of the WiFi terminal within the PS service domain which is established in the trusted gateway, if the AC has a routing function, the sending unit 93 sends the data packet which bears the downlink data traffic flow to the WiFi terminal according to the first IP address, wherein the first IP address and the IP address of the AC which manages the WiFi terminal belongs to the same network segment. If the AC does not have the routing function, the sending unit 93 sends the data packet which bears the downlink data traffic flow to the WiFi terminal according to the first IP address and the NAS-ID in the attribute information of the WiFi terminal.

Further, when the WiFi terminal accesses the PS service domain, the connection establishing unit 62 is further configured to determine a second access point name corresponding to the uplink data traffic flow according to the destination address of the uplink data traffic flow. If a second GGSN corresponding to the second access point name and the first GGSN are not the same device, or a second P-GW corresponding to the second access point name and the first P-GW are not the same device, the connection establishing unit 62 establishes a second PDP context connection with the second GGSN or a second PDN connection with the second P-GW, and obtains a third IP address, which is assigned to the WiFi terminal by the second GGSN or the second P-GW for accessing the PS service domain.

The sending unit 93 is further configured to send, via the second PDP context connection or the second PDN connection, the data packet which bears the uplink data traffic flow to the corresponding PS service domain according to the destination address of the uplink data traffic flow and the third IP address. The sending unit 93 is further configured to send, according to the third IP address, to the WiFi terminal the data packet of the downlink data traffic flow, which is sent to the WiFi terminal by the PS service domain and received via the second PDP context connection or the second PDN connection.

Further, after the connection establishing unit 62 establishes the first PDP context connection or the first PDN connection, the sending unit 93 is further configured to send an accounting request message to the AAA server to instruct the AAA server to account the WiFi terminal.

Specifically, the AC monitors the condition of the WiFi terminal accessing the PS service domain when the WiFi terminal accesses the PS service domain, and periodically reports the information on traffic, duration and so on of the WiFi terminal accessing the PS service domain. The sending unit 93 forwards the information on traffic and duration reported by the AC to the AAA server. The AAA server updates the CDR according to the information on traffic, duration and so on reported by the AC, and sends the accounting response message to the AC.

Further, when the WiFi terminal goes offline, the sending unit 93 is further configured to forward the accounting termination message sent by the AC to the AAA server.

The connection deleting unit 95 is configured to delete the first PDP context connection or the first PDN connection of the trusted gateway according to the accounting termination message forwarded by the sending unit 93.

Further, if the trusted gateway establishes the second PDP context connection or the second PDN connection, the connection deleting unit 95 deletes the second PDP context connection or the second PDN connection according to the accounting termination message forwarded by the sending unit 93.

Specifically, when the WiFi terminal initiates an offline request message, or after the WiFi terminal disconnects the communication with the trusted gateway in condition of weak signal, the AC sends the accounting termination message to the AAA server, and the sending unit 93 forwards the accounting termination message sent by the AC to the AAA server. Meanwhile, the connection deleting unit 95 deletes the first PDP context connection or the first PDN connection of the trusted gateway according to the accounting termination message. After receiving the accounting termination message forwarded by the trusted gateway, the AAA server responses to the accounting termination message, and closes the CDR file.

In the trusted gateway for WiFi terminal to access PS service domain provided by the embodiment of the present invention, the trusted gateway is triggered to establish the first PDP context connection or the first PDN connection by the accounting request message or the DHCP request message received by the receiving unit, making the trusted gateway to be an access point of the PS service domain, and enabling the WiFi terminal to access the PS service domain via the wireless local area network, the trusted gateway, and the established PDP context connection or the PDN connection. In this way, it is not necessary to establish a specific tunnel between the terminal and the trusted gateway, and the WiFi terminal does not need to be authenticated twice, which lightening the load of the WiFi terminal and reducing the complexity of operation and the cost of the WiFi terminal.

Further, the trusted gateway concerned in the embodiments of the present invention may be deployed separately or deployed on an existing network element, such as, for example, GGSN, PDG or P-GW.

It should be appreciated for those of ordinary skill in the art that all or a part of the processes in the above-mentioned method embodiments may be implemented with hardware associated with program instructions which may be stored in a computer readable storage medium and performs the processes in the above-mentioned method embodiments when executed. The above-mentioned storage medium includes various medium that may store program codes, including such as a ROM, a RAM, a magnetic disk, an optical disk, or the like.

The foregoing descriptions are merely some specific implementations of the invention, rather than limiting the protection scope of the invention. Any change or substitution that is readily conceived for any one skilled in the art within the technical scope disclosed by the invention shall fall into the protection scope of the invention. Therefore, the protection scope of the present invention shall be defined by the claims.

What is claimed is:

1. A method for a WiFi terminal to access a packet switch (PS) service domain, applied to a trusted gateway that communicates with communication devices in a wireless local area network and the PS service domain, comprising:
   receiving, by the trusted gateway, an accounting request message sent by an authentication, authorization and accounting (AAA) server; and
   establishing, by the trusted gateway, a first packet data protocol (PDP) context connection or a first packet data network (PDN) connection with the PS service domain according to attribute information of the WiFi terminal after receiving the accounting request message, so that the WiFi terminal accesses the PS service domain via the wireless local area network, the trusted gateway, and the first PDP context connection or the first PDN connection;
   wherein the attribute information of the WiFi terminal is obtained from the AAA server for the trusted gateway to establish the first PDP context connection or the first PDN connection with the PS service domain for the WiFi terminal to access the PS service domain.

2. The method according to claim 1,
   wherein the accounting request message is received by the trusted gateway, wherein the accounting request message carries the attribute information of the WiFi terminal, the attribute information comprising a first access point name; and
   wherein the establishing, by the trusted gateway, the first PDP context connection or a first PDN connection with the PS service domain according to attribute information of the WiFi terminal comprises: establishing the first PDP context connection with a first GGSN (Gateway GPRS Support Node) corresponding to the first access point name or establishing the first PDN connection with a first packet data network gateway (P-GW) corresponding to the first access point name, and obtaining a first IP address that is assigned to the WiFi terminal by the first GGSN or the first P-GW; and wherein after establishing, by the trusted gateway, the first PDP context connection or the first PDN connection with the PS service domain, the method further comprises:
 sending an accounting request response message to an access controller (AC) through the AAA server, the accounting request response message carrying the first IP address.

3. The method according to claim 2,
wherein before receiving the accounting request message sent by the AAA server, the method further comprises:
 authenticating, by the AC, the WiFi terminal, and assigning to the WiFi terminal a second IP address within the wireless local area network; and wherein after establishing, by the trusted gateway, the first PDP context connection or the first PDN connection, when the trusted gateway receives an uplink data traffic flow initiated by the WiFi terminal to access the PS service domain, the method further comprises:
 converting, by the trusted gateway, the second IP address carried by a data packet that bears the uplink data traffic flow, into the first IP address; and
 sending, by the trusted gateway, the data packet that bears the uplink data traffic flow to a corresponding PS service domain, via the first PDP context connection or the first PDN connection, according to a destination address of the uplink data traffic flow and the first IP address; and wherein after establishing, by the trusted gateway, the first PDP context connection or the first PDN connection with the PS service domain, when the trusted gateway receives a downlink data traffic flow that is sent from the PS service domain to the WiFi terminal, the method further comprises:
 converting, by the trusted gateway, the first IP address carried by a data packet that bears the downlink data traffic flow, into the second IP address; and
 sending, by the trusted gateway, the data packet that bears the downlink data traffic flow to the WiFi terminal according to the second IP address.

4. The method according to claim 2, wherein
before receiving the accounting request message sent by the AAA server, the method further comprises: authenticating, by the AC, the WiFi terminal, and assigning to the WiFi terminal a second IP address within the wireless local area network; and
after establishing, by the trusted gateway, the first PDP context connection or the first PDN connection, when the trusted gateway receives an uplink data traffic flow initiated by the WiFi terminal to access the PS service domain, the method further comprises: determining a second access point name of the uplink data traffic flow according to a destination address of the uplink data traffic flow, establishing, by the trusted gateway, a second PDP context connection with a second GGSN or a second PDN connection with a second P-GW if the second GGSN corresponding to the second access point name and the first GGSN are not the same device or a second P-GW corresponding to the second access point name and the first P-GW are not the same device, and obtaining a third IP address, which is assigned by the second GGSN or the second P-GW to the WiFi terminal for accessing the PS service domain;
 converting, by the trusted gateway, the second IP address carried by a data packet that bears the uplink data traffic flow, into the third IP address; and
 sending, by the trusted gateway, the data packet that bears the uplink data traffic flow to a corresponding PS service domain, via the second PDP context connection or the second PDN connection, according to the destination address of the uplink data traffic flow and the third IP address; and
after establishing, by the trusted gateway, the second PDP context connection or the second PDN connection, when the trusted gateway receives a downlink data traffic flow which is sent from the PS service domain to the WiFi terminal via the second PDP context connection or the second PDN connection, the method further comprises:
 converting, by the trusted gateway, the third IP address carried by a data packet that bears the downlink data traffic flow, into the second IP address; and
 sending, by the trusted gateway, the data packet that bears the downlink data traffic flow to the WiFi terminal according to the second IP address.

5. The method according to claim 1, wherein after establishing, by the trusted gateway, the first PDP context connection or the first PDN connection, the method further comprises:
 receiving, by the trusted gateway, an accounting termination message sent by the AAA server after the WiFi terminal goes offline; and
 deleting, by the trusted gateway, the first PDP context connection or the first PDN connection.

6. A trusted gateway for a WiFi terminal to access a packet switch (PS) service domain, wherein the trusted gateway communicates with communication devices in a wireless local area network and the PS service domain, wherein the trusted gateway comprises;
 a processor; and
 a memory having processor-executable instructions stored thereon that, when executed, cause the processor to:
  receive an accounting request message sent by an authentication, authorization and accounting (AAA) server; and
  establish a first packet data protocol (PDP) context connection or a first packet data network (PDN) connection with the PS service domain according to attribute information of the WiFi terminal after receiving the accounting request message, so that the WiFi terminal accesses the PS service domain via the wireless local area network, the trusted gateway, and the established first PDP context connection or the first PDN connection;
 wherein the attribute information of the WiFi terminal is obtained from the AAA server for the trusted gateway to establish the first PDP context connection or the first PDN connection with the PS service domain for the WiFi terminal to access the PS service domain.

7. The trusted gateway according to claim 6,
wherein the accounting request message carries the attribute information of the WiFi terminal, the attribute information comprising a first access point name;
wherein the processor is further configured to:
 establish the first PDP context connection with a first GGSN (Gateway GPRS Support Node) corresponding to the first access point name or establish the first PDN connection with a first packet data network gateway (P-GW) corresponding to the first access point names;

obtain a first IP address which is assigned to the WiFi terminal by the first GGSN or the first P-GW; and send an accounting request response message to an access controller (AC) through the AAA server after the establishing the first PDP context connection or the first PDN connection, the accounting request response message carrying the first IP address, so that the WiFi terminal accesses the PS service domain via the wireless local area network.

8. The trusted gateway according to claim 7, wherein the processor is further configured to:

convert the second IP address carried by a data packet that bears an uplink data traffic flow initiated by the WiFi terminal, into the first IP address;

convert the first IP address carried by a data packet that bears the downlink data traffic flow sent from the PS service domain to the WiFi terminal, into the second IP address, the second IP address being an IP address within the wireless local area network assigned to the WiFi terminal by an access controller (AC) after the AC authenticates the WiFi terminal;

send the data packet that bears the uplink data traffic flow to a corresponding PS service domain via the first PDP context connection or the first PDN connection, according to a destination address of the uplink data traffic flow and the first IP address; and send the data packet that bears the downlink data traffic flow to the WiFi terminal according to the second IP address.

9. The trusted gateway according to claim 8, wherein the processor is further configured to:

determine a second access point name corresponding to the uplink data traffic flow according to the destination address of the uplink data traffic flow;

establish a second PDP context connection with the second GGSN or a second PDN connection with the second P-GW if a second GGSN corresponding to the second access point name and the first GGSN are not the same device or a second P-GW corresponding to the second access point name and the first P-GW are not the same device;

obtain a third IP address, which is assigned by the second GGSN or the second P-GW to the WiFi terminal for accessing the PS service domain;

convert the second IP address carried by a data packet that bears the uplink data traffic flow, into the third IP address;

convert the third IP address carried by a data packet that bears the downlink data traffic flow, into the second IP address;

send the data packet that bears the uplink data traffic flow to a corresponding PS service domain via the second PDP context connection or the second PDN connection, according to the destination address of the uplink data traffic flow and the third IP address; and send, according to the second IP address, the data packet of the downlink data traffic flow sent by the PS service domain towards the WiFi terminal which is received via the second PDP context connection or the second PDN connection, to the WiFi terminal.

10. The trusted gateway according to claim 6, wherein the processor is further configured to:

receive an accounting termination message sent by the AAA server after the WiFi terminal goes offline; and delete the first PDP context connection or the first PDN connection after receiving the accounting termination message.

* * * * *

UNITED STATES PATENT AND TRADEMARK OFFICE
CERTIFICATE OF CORRECTION

PATENT NO. : 9,736,157 B2
APPLICATION NO. : 14/478576
DATED : August 15, 2017
INVENTOR(S) : Li et al.

Page 1 of 1

It is certified that error appears in the above-identified patent and that said Letters Patent is hereby corrected as shown below:

In the Claims

Column 37, Line 3, "names;" should read -- name; --.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*